United States Patent
Jung et al.

(10) Patent No.: US 9,942,729 B2
(45) Date of Patent: Apr. 10, 2018

(54) METHOD AND APPARATUS FOR ESTABLISHING COMMUNICATION BETWEEN TERMINALS

(71) Applicant: SAMSUNG ELECTRONICS CO., LTD., Suwon-si (KR)

(72) Inventors: Bae-eun Jung, Seongnam-si (KR); Ji-youn Jung, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 112 days.

(21) Appl. No.: 14/909,397

(22) PCT Filed: Aug. 1, 2014

(86) PCT No.: PCT/KR2014/007105
§ 371 (c)(1),
(2) Date: Feb. 1, 2016

(87) PCT Pub. No.: WO2015/016655
PCT Pub. Date: Feb. 5, 2015

(65) Prior Publication Data
US 2016/0198314 A1 Jul. 7, 2016

(30) Foreign Application Priority Data
Aug. 1, 2013 (KR) .................. 10-2013-0091592

(51) Int. Cl.
*H04W 4/08* (2009.01)
*H04W 4/20* (2009.01)
*H04W 76/02* (2009.01)

(52) U.S. Cl.
CPC ............... *H04W 4/08* (2013.01); *H04W 4/20* (2013.01); *H04W 76/023* (2013.01); *H04W 76/025* (2013.01); *H04W 76/027* (2013.01)

(58) Field of Classification Search
None
See application file for complete search history.

(56) References Cited

U.S. PATENT DOCUMENTS 7,552,175 B2   6/2009  Luo et al.
2006/0114843 A1   6/2006  Dssouli et al.
(Continued)

OTHER PUBLICATIONS

Simons, et al.; "XEP-0272: Multiparty Jingle (Muji)", XMPP Standards Foundation, Updated Sep. 2009, 7 pages total.
(Continued)

*Primary Examiner* — Diane Lo
(74) *Attorney, Agent, or Firm* — Sughrue Mion, PLLC

(57) ABSTRACT

Provided is a method of establishing communication between a plurality of terminals by a first client terminal of the plurality of terminals, the method including: receiving an initiation signaling message comprising a communication initiation tag and a terminal list of terminals from a host terminal of the plurality of terminals; determining whether to establish communication with the host terminal, based on a communication state of the first client terminal; generating connection information indicating whether to establish communication with the host terminal; determining a second client terminal of the plurality of terminals as a next priority terminal based on the terminal list of terminals; and transmitting the connection information and a trigger signaling message comprising a communication extension tag to the second client terminal.

13 Claims, 15 Drawing Sheets

(56) References Cited

U.S. PATENT DOCUMENTS

| | | |
|---|---|---|
| 2007/0177554 A1 | 8/2007 | Yang et al. |
| 2009/0059815 A1 | 3/2009 | Cheng et al. |
| 2010/0150063 A1 | 6/2010 | Lee et al. |
| 2011/0105139 A1 | 5/2011 | On |
| 2012/0002570 A1* | 1/2012 | Nishida ............... H04W 76/025 370/254 |
| 2012/0254411 A1* | 10/2012 | Ito ....................... H04L 67/2847 709/224 |

OTHER PUBLICATIONS

Search Report dated Nov. 19, 2014, issued by the International Searching Authority in counterpart International Application No. PCT/KR2014/007105 (PCT/ISA/210).

Written Opinion dated Nov. 19, 2014, issued by the International Searching Authority in counterpart International Application No. PCT/KR2014/007105 (PCT/ISA/237).

* cited by examiner

METHOD AND APPARATUS FOR ESTABLISHING COMMUNICATION BETWEEN TERMINALS

CROSS-REFERENCE TO RELATED PATENT APPLICATIONS

The present application is a national stage application under 35 U.S.C. § 371 of International Application No. PCT/KR2014/007105, which claims priority from Korean Patent Application No. 10-2013-0091592, filed on Aug. 1, 2013 in the Korean Intellectual Property Office, the disclosures of which are incorporated herein by reference in their entireties.

BACKGROUND

Methods and apparatuses consistent with exemplary embodiments relate to establishing communication between a plurality of terminals, and more particularly, to establishing full-mesh communication between a plurality of terminals.

Recent improvements in network and device performance has resulted in a changed communication culture. That is, terminals such as smartphones may provide various communication services in addition to a voice communication service, including a multipoint communication service.

Examples of a multipoint communication method include a server microcontroller-based communication method in which a server receives and mixes media content and transmits the same to participant devices, and a full-mesh communication method in which all clients connect a media session with other participants and media content is transmitted and received through channels of the participants. In the related art, because a client device has difficulty in processing a plurality of media due to restrictions of the client device, the server microcontroller-based communication method is used rather than the full-mesh communication method.

SUMMARY

According to an aspect of an exemplary embodiment, there is provided a method of establishing communication between a plurality of terminals by a first client terminal of the plurality of terminals, the method including: receiving an initiation signaling message comprising a communication initiation tag and a terminal list of terminals from a host terminal of the plurality of terminals; determining whether to establish communication with the host terminal, based on a communication state of the first client terminal; generating connection information indicating whether to establish communication with the host terminal; determining a second client terminal of the plurality of terminals as a next priority terminal based on the terminal list of terminals; and transmitting the connection information and a trigger signaling message comprising a communication extension tag to the second client terminal.

The method may further include establishing communication between the first client terminal and the second client terminal based on the trigger signaling message, and the initiation signaling message may be provided from the host terminal to the second client terminal and communication between the host terminal and the second client terminal may be established based on a communication state of the second client terminal.

The transmitting may be performed in response to the first client terminal establishing communication with the host terminal.

The method may further include receiving a communication acceptance message indicating communication establishment acceptance from the second client terminal in response to the trigger signaling message when the host terminal and the second client terminal establish communication therebetween, and receiving a communication rejection message indicating communication establishment rejection from the second client terminal in response to the trigger signaling message when the host terminal and the second client terminal do not establish communication therebetween.

The method may further include receiving an invitation acceptance signaling message comprising a communication invitation acceptance tag from a third client terminal. The third terminal may not be indicated in the terminal list of terminals, an invitation signaling message including the communication invitation tag and the terminal list of terminals may be provided from the host terminal to the third client terminal, and the invitation acceptance signaling message may be provided from the third client terminal to the first client terminal in response to the invitation signaling message.

The method may further include simultaneously establishing communication between the first client terminal and the third client terminal, and maintaining communication between the first client terminal and the host terminal.

The method may further include receiving a communication termination message from the second terminal; terminating communication with the second client terminal according to the communication termination message received from the second client terminal; receiving a reentry signaling message comprising a communication reentry tag and the terminal list of terminals from the second client terminal; and transmitting a communication rejection message indicating communication establishment rejection to the second client terminal in response to the reentry signaling message.

The method may further include terminating communication with the host terminal and the second client terminal; transmitting a reentry signaling message comprising a communication reentry tag and the terminal list of terminals to the host terminal and the second client terminal; receiving a response to the reentry signaling message from the host terminal; and transmitting a reentry acceptance signaling message comprising a communication reentry acceptance tag to the second client terminal based on the response. The reentry acceptance signaling message may be transmitted to the second client terminal the response indicating reentry acceptance.

According to an aspect of another exemplary embodiment, there is provided a method of establishing communication between a plurality of terminals by a host terminal of the plurality of terminals, the method including: generating an initiation signaling message comprising a communication initiation tag and a terminal list of terminals; transmitting the generated initiation signaling message to a first client terminal of the plurality of terminals and a second client terminal of the plurality of terminals; receiving, based on the generated initiation signaling message, a first response from the first client terminal and a second response from the second client terminal; and determining whether to establish communication with the first client terminal based on the first response and the second client terminal based on the second response. The terminal list of terminals includes information indicating communication priority of the plurality of client terminals, and a communication establishment trial is performed between the plurality of client terminals according to the communication priority.

The method may further include transmitting an invitation signaling message comprising a communication invitation tag to a third client terminal not indicated in the terminal list of terminals; receiving a third response from the third client terminal; and determining whether to establish communication with the third client terminal based on the third response.

The method may further include receiving a communication termination message from the first client terminal; terminating communication with the first client terminal according to the communication termination message; receiving a reentry signaling message comprising a communication reentry tag and the terminal list of terminals from the first client terminal; and comparing the received terminal list of terminals in the reentry signaling message with a stored terminal list of terminals communicating with the host terminal.

The method may further include generating and transmitting a communication acceptance message indicating communication establishment acceptance to the first client terminal when the terminal list of terminals comprised in the reentry signaling message is identical to the terminal list of terminals communicating with the host terminal as a comparison result; and generating and transmitting a communication rejection message indicating communication establishment rejection to the first client terminal when the terminal list of terminals comprised in the reentry signaling message is not identical to the terminal list of terminals communicating with the host terminal.

According to an aspect of yet another exemplary embodiment, there is provided a first client terminal of a plurality of terminals configured to establish communication between the plurality of terminals, the first client terminal including: a reception interface configured to receive an initiation signaling message comprising a communication initiation tag and a terminal list of terminals from a host terminal of the plurality of terminals; a controller configured to determine whether to establish communication with the host terminal, based on a communication state of the first client terminal, generate connection information indicating whether to establish communication with the host terminal, and determine a second client terminal of the plurality of terminals as a next priority terminal based on the terminal list of terminals; and a transmission interface configured to transmit the connection information and a trigger signaling message comprising a communication extension tag to the second client terminal.

According to an aspect of still another exemplary embodiment, there is provided a host terminal of a plurality of terminals configured to establish communication between the plurality of terminals, the host terminal including: a determiner configured to generate an initiation signaling message comprising a communication initiation tag and a terminal list of terminals; and a communicator configured to transmit the generated initiation signaling message to a first client terminal of the plurality of terminals a second client terminal of the plurality of terminals, and to receive a first response from the first client terminal and a second response from the second client terminal. The determiner is further configured to determine whether to establish communication with the first client terminal based on the first response and the second client terminal based on the second response, the terminal list of terminals includes information indicating communication priority of the plurality of client terminals, and a communication establishment trial is performed between the plurality of client terminals according to the communication priority.

According to an aspect of another exemplary embodiment, there is provided a non-transitory computer-readable recording medium having embodied thereon a computer program that, when executed by a processor of a first client terminal of a plurality of terminals, causes the first client terminal to execute a method of establishing communication between the plurality of terminals, the method including: receiving an initiation signaling message comprising a communication initiation tag and a terminal list of terminals from a host terminal of the plurality of terminals; determining whether to establish communication with the host terminal, based on a communication state of the first client terminal; generating connection information indicating whether to establish communication with the host terminal; determining a second client terminal of the plurality of terminals as a next priority terminal based on the terminal list of terminals; and transmitting the connection information and a trigger signaling message comprising a communication extension tag to the second client terminal.

According to an aspect of yet still another exemplary embodiment, there is provided a method of reestablishing communication between a plurality of terminals by a first client terminal of the plurality of terminals, the method including: transmitting a first reentry signaling message comprising a first terminal list of terminals to a second client terminal of the plurality of terminals and a host terminal of the plurality of terminals; receiving a rejection message comprising a second terminal list of terminals from the second client terminal; transmitting a second reentry signaling message comprising the second terminal list of terminals to the host terminal; receiving a reentry acceptance signaling message from the host terminal; transmitting the reentry acceptance signaling message to a third client terminal of the plurality of terminals; receiving a communication acceptance message from the third client terminal; and reestablishing communication between the plurality of terminals based on the communication acceptance message.

The method may further include transmitting the reentry acceptance signaling message to the second client terminal and the host terminal.

The reestablished communication between the plurality of terminals may include directly connecting the first terminal with each of the second client terminal, the third client terminal and the host terminal.

The rejection message may indicate whether a maximum number of terminals that may simultaneously communicate has been reached.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION OF EXEMPLARY EMBODIMENTS

Figure 1:
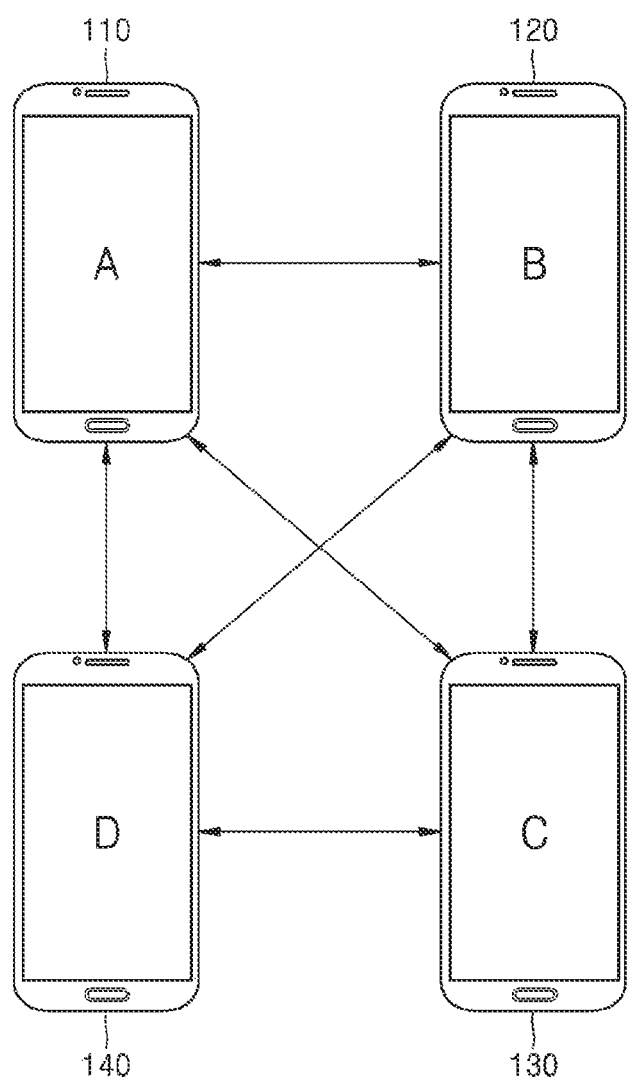
FIG. 1 is a schematic diagram illustrating a method for establishing communication between a plurality of terminals, according to an exemplary embodiment.

Reference will now be made in detail to exemplary embodiments which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are described below, by referring to the figures, to explain aspects of exemplary embodiments. As used herein, the term "and/or" includes any and all combinations of one or more of the associated listed items.

Methods and apparatuses consistent with exemplary embodiments will be described below in detail with reference to the accompanying drawings so that those of ordinary skill in the art may easily implement exemplary embodiments. In this regard, exemplary embodiments may have different forms and should not be construed as being limited to the descriptions set forth herein. In addition, portions irrelevant to the description of exemplary embodiments will be omitted in the drawings for a clear description of exemplary embodiments, and like reference numerals will denote like elements throughout the specification.

It will be understood that when an element is referred to as being "connected" to another element, it may be directly connected to the other element or may be electrically connected to the other element with other element(s) interposed therebetween. It will also be understood that the terms "comprises", "includes", and "has", when used herein, specify the presence of stated elements, but do not preclude the presence or addition of other elements, unless otherwise defined.

Hereinafter, exemplary embodiments will be described in detail with reference to the accompanying drawings.

FIG. 1 is a schematic diagram illustrating a method for establishing communication between a plurality of terminals, according to an exemplary embodiment.

Referring to FIG. 1, communication is established between a terminal A 110, a terminal B 120, a terminal C 130, and a terminal D 140 based on the method for establishing communication between a plurality of terminals, according to an exemplary embodiment. Herein, the terminal A 110 is a host terminal, and the terminal B 120, the terminal C 130, and the terminal D 140 are client terminals. The terminal A 110 may transmit a predetermined message for establishing communication to the terminal B 120, the terminal C 130, and the terminal D 140.

The terminal B 120, the terminal C 130, and the terminal D 140 may establish communication with the terminal A 110 based on their respective communication states. Also, according to an exemplary embodiment, when communication is established with the terminal A 110, the terminal B 120 may transmit a predetermined message for establishing communication with the terminal C 130 and the terminal D 140. Herein, the predetermined message transmitted by the terminal B 120 may be discerned from the predetermined message transmitted by the terminal A 110.

The terminal A 110 transmits a message for initiating communication, and the terminal B 120 transmits a message for extending initiated communication. That is, patterns of communication to be established by the terminals are different from each other. According to an exemplary embodiment, the messages for the respective communication patterns may be discerned from each other by tag information inserted into the respective messages according to the patterns of communication to be established by the respective terminals.

According to an exemplary embodiment, signaling messages for the respective communication patterns may be discerned according to user intention by subdividing information received by user interfaces on the respective terminals. For example, a user intention may be included in a signaling message in the form of a tag. Based on a tag of a signaling message, a terminal may determine a pattern of communication to be established according to a user's intention.

Also, a signaling message may be generated based on not only information received by a user interface, but also a communication state of each terminal and a received signaling message.

Types of signaling messages according to an exemplary embodiment may include an initiation signaling message, a trigger signaling message, an invitation signaling message, an invitation acceptance signaling message, a reentry signaling message, and a reentry acceptance signaling message.

According to an exemplary embodiment, based on a type of a received signaling message, each terminal may determine a pattern of communication to be established and may determine information about various additional services. Herein, the information about various additional services may include ringtones, bell sounds, and notification sounds for notifying the user of information related to communication establishment in a terminal.

For example, when a terminal is to reenter current communication, the host terminal receiving a reentry signaling message may be notified not by a bell sound, but by a vibration, thereby reducing interference with the current communication.

Figure 2:
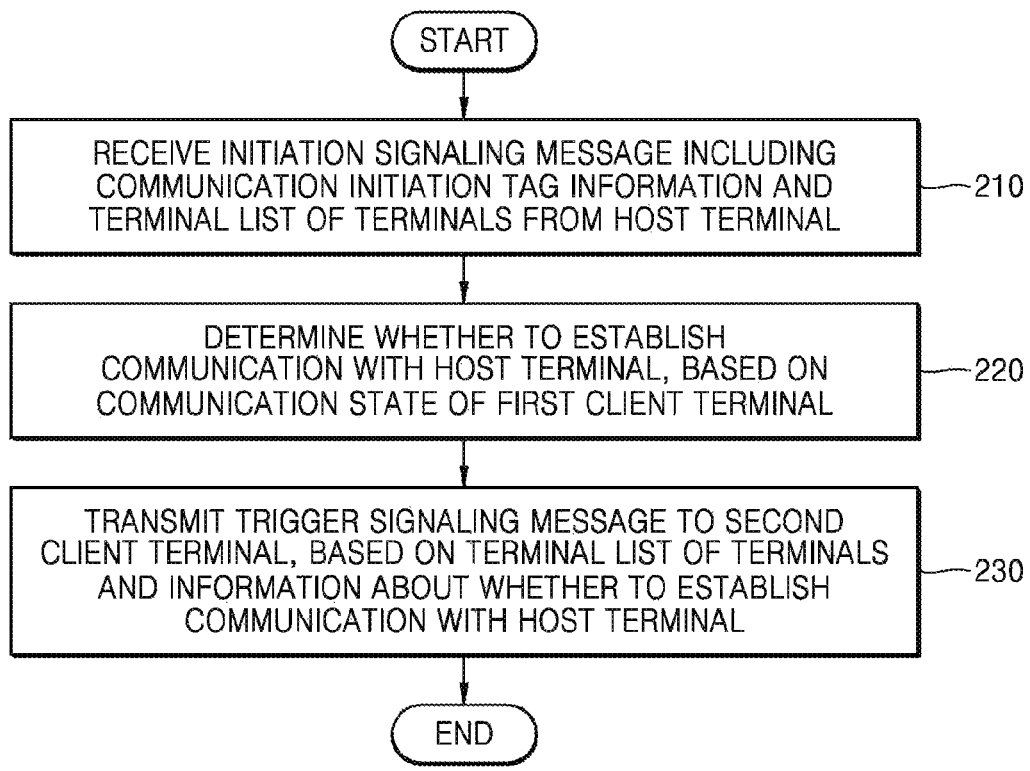
FIG. 2 is a flowchart of a method for a first client terminal to establish communication with a plurality of other terminals, according to an exemplary embodiment.

FIG. 2 is a flowchart of a method for a first client terminal to establish communication with a plurality of other terminals, according to an exemplary embodiment.

Referring to FIG. 2, in operation S210, the first client terminal may receive an initiation signaling message including communication initiation tag information and a terminal list of terminals from a host terminal.

Herein, the communication initiation tag information may represent a communication pattern where the host terminal first establishes communication with at least one client terminal. The communication initiation tag information may be included in a signaling message transmitted from the host terminal to at least one client terminal, and the signaling message including the communication initiation tag information may be an initiation signaling message.

In operation S220, the first client terminal may determine whether to establish communication with the host terminal, based on a communication state of the first client terminal.

When the first client terminal receives an initiation signaling message from the host terminal, the first client terminal may determine whether communication may be established with the host terminal. For example, when communication has already been established between the first client terminal and another terminal, the first client terminal may not establish communication with the host terminal. In this case, the first client terminal may transmit a communication rejection message indicating communication establishment rejection to the host terminal.

On the other hand, when the first client terminal has not established communication with another terminal, the first client terminal may establish communication with the host terminal. In this case, the first client terminal may transmit a communication acceptance message indicating communication establishment acceptance to the host terminal.

In operation S230, the first client terminal may transmit a trigger signaling message including communication extension tag information to a second client terminal, which is a next-priority terminal following the first client terminal, based on the terminal list of terminals, and information about whether to establish communication with the host terminal. The communication extension tag information may represent a communication pattern where a client terminal, which has established communication connection with the host terminal, extends the communication connection with the host terminal and establishes communication with another client terminal included in the terminal list of terminals.

In detail, when the first client terminal establishes communication with the host terminal in operation S220, the first client terminal may transmit a trigger signaling message to the second client terminal.

The second client terminal, which is a next-priority terminal following the first client terminal, may be represented as a next-priority terminal following the first client terminal in the terminal list of terminals. The host terminal may be represented as a first-priority terminal in the terminal list of terminals.

Herein, the terminal list of terminals may include information about communication priority of a plurality of client terminals. According to an exemplary embodiment, a communication establishment trial may be gradually performed between the plurality of client terminals according to the communication priority.

According to an exemplary embodiment, the first client terminal may establish communication with the second client terminal based on a trigger signaling message transmitted to the second client terminal that is a next-priority terminal in the terminal list of terminals. Herein, the second client terminal may be a terminal that may establish communication with the host terminal based on an initiation signaling message provided from the host terminal to the second client terminal.

According to an exemplary embodiment, when the host terminal and the second client terminal establish communication, the first client terminal may receive a communication acceptance message indicating communication establishment acceptance from the second client terminal in response to the trigger signaling message.

On the other hand, when the host terminal and the second client terminal do not establish communication, the first client terminal may receive a communication rejection message indicating communication establishment rejection from the second client terminal in response to the trigger signaling message.

When communication is not established due to a connection delay between the host terminal and the second client terminal, the second client terminal may transmit a communication rejection message including communication retrial tag information. According to an exemplary embodiment, when communication establishment is rejected, communication rejection reason tag information may be included in the communication rejection message so that a detailed reason for communication establishment rejection may be identified. Upon receiving the communication rejection message including the communication retrial tag information, the first client terminal may retransmit a trigger signaling message to the host terminal.

According to another exemplary embodiment, upon receiving the communication rejection message including the communication retrial tag information, the first client terminal may retransmit a trigger signaling message to the host terminal a predetermined number of times.

Figure 3:
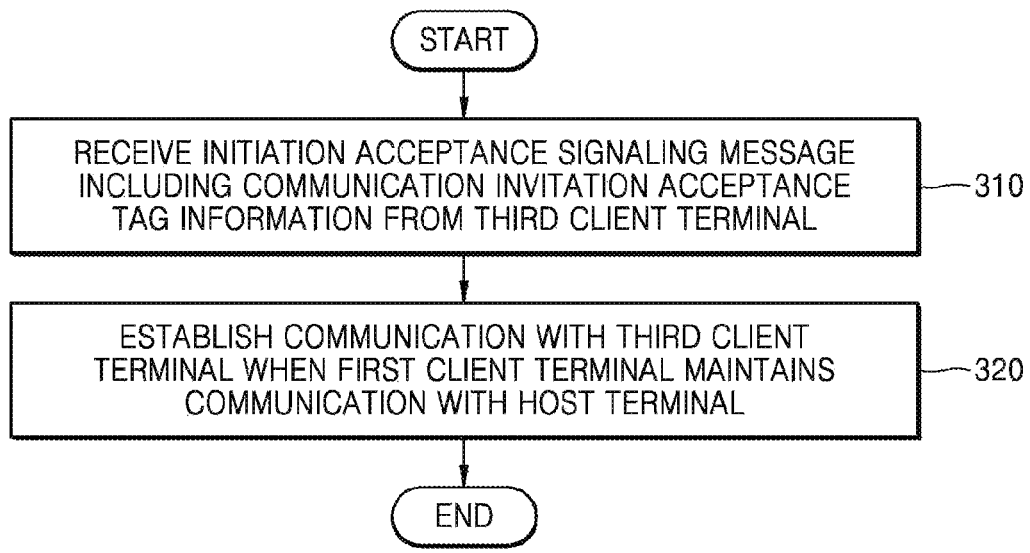
FIG. 3 is a flowchart of a method for a first client terminal to establish communication with a new client terminal invited by a host terminal, according to an exemplary embodiment.

FIG. 3 is a flowchart of a method for the first client terminal to establish communication with a new client terminal invited by the host terminal, according to an exemplary embodiment.

Referring to FIG. 3, in operation S310, the first client terminal may receive an invitation acceptance signaling message including communication invitation acceptance tag information from a third client terminal that does not exist in the terminal list of terminals.

Herein, the communication initiation acceptance tag information may represent a communication pattern where the third client terminal, which has accepted a communication invitation from the host terminal, establishes communication with at least one client terminal maintaining communication establishment. That is, the invitation acceptance signaling message is a signaling message that is transmitted from the third client terminal, which has accepted a communication invitation from the host terminal, to a client terminal maintaining communication establishment with the host terminal.

The host terminal may transmit an invitation signaling message, including communication invitation tag information and the terminal list of terminals, to the third client terminal to invite the third client terminal. The invitation acceptance signaling message may be provided from the third client terminal to the first client terminal in response to the invitation signaling message.

In operation S320, when the first client terminal maintains communication establishment with the host terminal, the first client terminal may establish communication with the third client terminal. For example, when the first client terminal maintains communication establishment with the host terminal without leaving current communication, the first client terminal may establish communication with the third client terminal.

In detail, the first client terminal may establish communication with the third client terminal by transmitting a communication acceptance message indicating communication establishment acceptance in response to the invitation acceptance signaling message received from the third client terminal.

For example, when leaving current communication and terminating communication establishment with the host terminal, the first client terminal may reject communication establishment with the third client terminal.

In detail, the first client terminal may reject communication establishment with the third client terminal by transmitting a communication rejection message indicating communication establishment rejection in response to the invitation acceptance signaling message received from the third client terminal.

Figure 4:
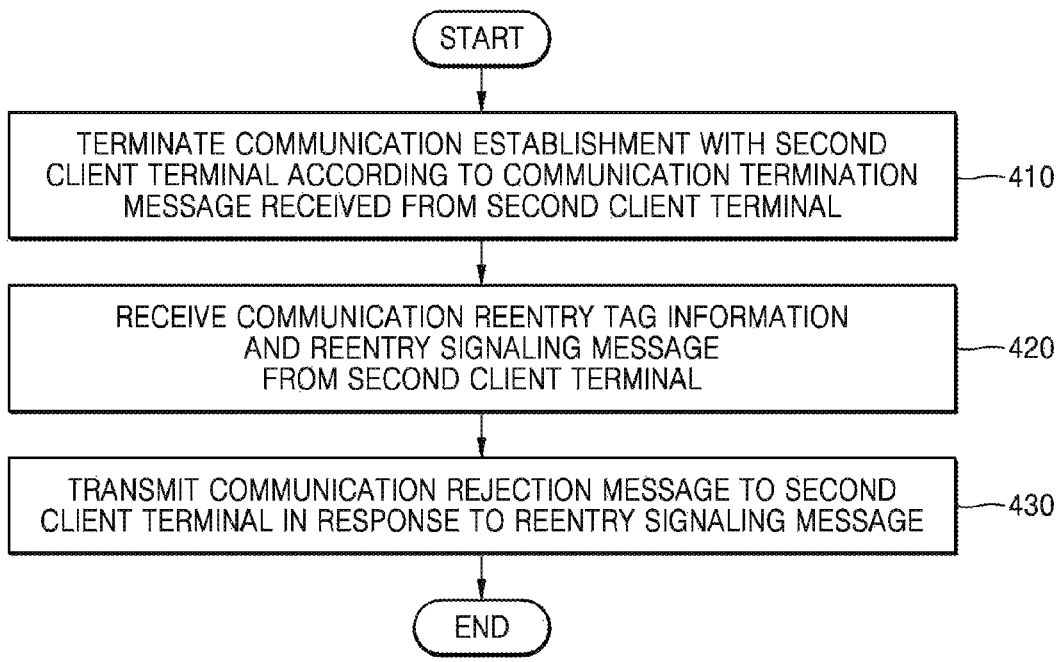
FIG. 4 is a flowchart of a method for a first client terminal to establish communication with a second client terminal that leaves and then reenters current communication, according to an exemplary embodiment.

FIG. 4 is a flowchart of a method for the first client terminal to establish communication with the second client terminal that leaves and then reenters current communication, according to an exemplary embodiment.

Referring to FIG. 4, in operation S410, the first client terminal may terminate communication with the second client terminal according to a communication termination message received from the second client terminal.

In operation S420, the first client terminal may receive a reentry signaling message, including communication reentry tag information and the terminal list of terminals, from the second client terminal.

Herein, the communication reentry tag information may represent a communication pattern where a client terminal leaves current communication and then reenters the current communication. The communication reentry tag information may be included in a signaling message transmitted from the reentering second client terminal to the first client terminal and the host terminal participating in the current communication. The signaling message including the communication reentry tag information may be the reentry signaling message.

In operation S430, the first client terminal may transmit a communication rejection message indicating communication establishment rejection to the second client terminal in response to the reentry signaling message. According to an exemplary embodiment, the host terminal may determine whether a client terminal reenters current communication. Therefore, the first client terminal may transmit a communication rejection message in response to the reentry signaling message of the second client terminal.

On the other hand, when the second client terminal receives communication establishment acceptance from the host terminal, the second client terminal may transmit a reentry acceptance signaling message to client terminals except the host terminal among a plurality of terminals entering current communication.

Herein, the reentry acceptance signaling message may include communication reentry acceptance tag information. The communication reentry acceptance tag information may represent a communication pattern where a client terminal, which has left current communication, receives communication establishment acceptance from the host terminal and reenters the current communication.

Figure 5:
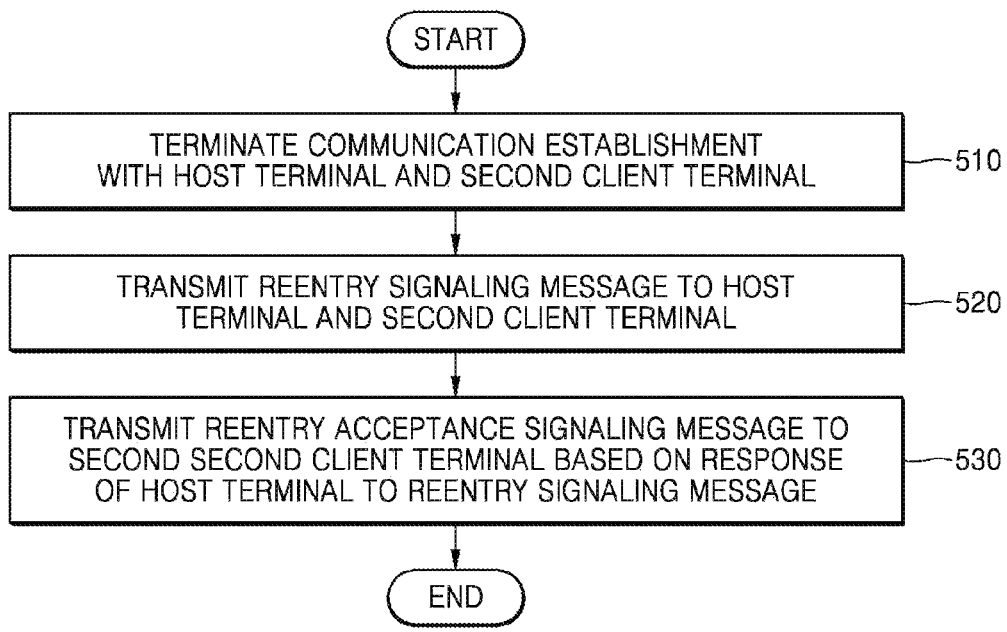
FIG. 5 is a flowchart of a method for a first client terminal to establish communication with current terminals when the first client terminal leaves and then reenters current communication, according to an exemplary embodiment.

FIG. 5 is a flowchart of a method for the first client terminal to establish communication with current terminals when the first client terminal leaves and then reenters current communication, according to an exemplary embodiment.

Referring to FIG. 5, in operation S510, the first client terminal may terminate communication establishment with the host terminal and the second client terminal.

In operation S420, the first client terminal may transmit a reentry signaling message, including communication reentry tag information and the terminal list of terminals, to the host terminal and the second client terminal. Herein, information about the terminals entering the current communication may be included in the terminal list of terminals.

In operation S530, the first client terminal may transmit a reentry acceptance signaling message including communication reentry acceptance tag information to the second client terminal based on a response of the host terminal to the reentry signaling message. Herein, the reentry acceptance signaling message may be transmitted to the second client terminal when the first client terminal receives communication reentry acceptance from the host terminal.

According to an exemplary embodiment, the first client terminal may receive communication reentry acceptance from the host terminal when the terminal list of terminals included in the reentry signaling message is identical to a terminal list of terminals communicating with the host terminal at the time when the host terminal receives the reentry signaling message.

On the other hand, the first client terminal may not receive communication reentry acceptance from the host terminal when the terminal list of terminals included in the reentry signaling message is not identical to a terminal list of terminals communicating with the host terminal at the time when the host terminal receives the reentry signaling message. The first client terminal may update the terminal list of terminals included in the reentry signaling message and transmit a reentry signaling message including the updated terminal list of terminals to the host terminal.

After the first client terminal receives communication reentry establishment acceptance from the host terminal, the second client terminal may leave current communication. In this case, the second client terminal may transmit a communication rejection message indicating communication establishment rejection in response to the reentry acceptance signaling message.

Figure 6:
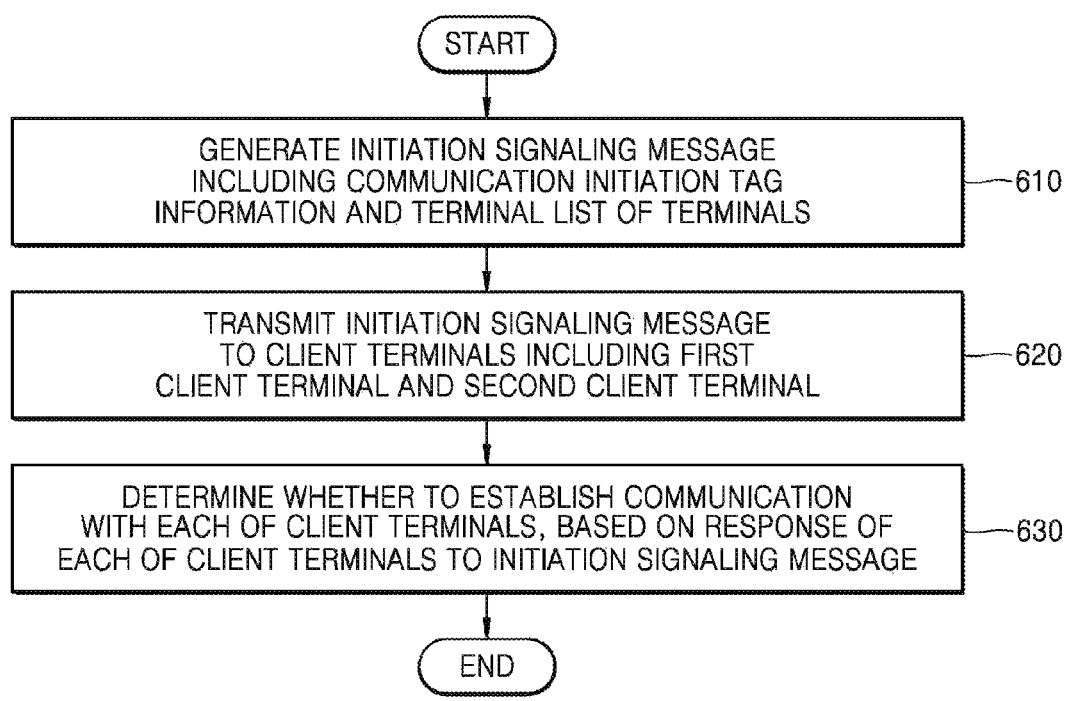
FIG. 6 is a flowchart of a method for a host terminal to establish communication with a plurality of other terminals, according to an exemplary embodiment.

FIG. 6 is a flowchart of a method for the host terminal to establish communication with a plurality of other terminals, according to an exemplary embodiment.

Referring to FIG. 6, in operation S610, the host terminal may generate an initiation signaling message including communication initiation tag information and a terminal list of terminals.

Herein, the communication initiation tag information may represent a communication pattern where the host terminal first establishes communication with at least one client terminal. The communication initiation tag information may be included in a signaling message transmitted from the host terminal to at least one client terminal, and the signaling message including the communication initiation tag information may be the initiation signaling message.

Herein, the terminal list of terminals may include information about communication priority of a plurality of client terminals. According to an exemplary embodiment, a communication establishment trial may be gradually performed between the plurality of client terminals according to the communication priority.

For example, when a client terminal B, a client terminal C, and a client terminal D are represented in the terminal list of terminals in the stated order, the communication priority may be determined according to the stated order. The client terminal B may transmit a trigger signaling message to the client terminal C and the client terminal D that are next-priority client terminals following the client terminal B. The client terminal C may transmit a trigger signaling message to the client terminal D that is a next-priority client terminal following the client terminal C.

In operation S620, the host terminal may transmit the generated initiation signaling message to a plurality of client terminals including the first client terminal and the second client terminal.

In operation S630, the host terminal may determine whether to establish communication with each of the client terminals, based on a response of each of the client terminals to the initiation signaling message transmitted in operation S620.

For example, when the host terminal receives a communication acceptance message indicating communication establishment acceptance from the first client terminal, the host terminal may establish communication with the first client terminal. On the other hand, when the host terminal receives a communication rejection message indicating communication establishment rejection from the first client terminal, the host terminal may reject communication establishment with the first client terminal.

Figure 7:
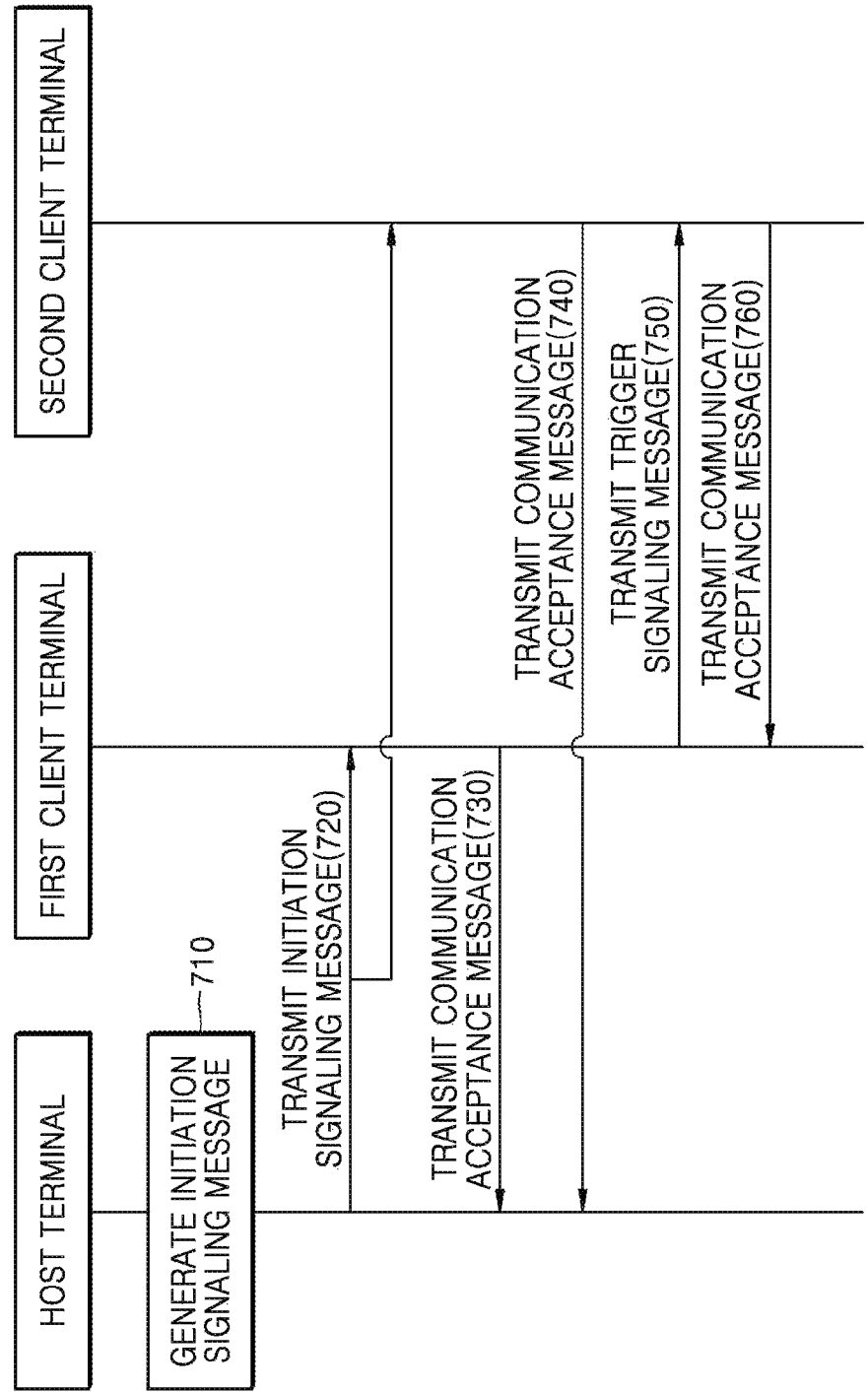
FIG. 7 is a flow diagram illustrating a communication pattern of initiating communication, according to an exemplary embodiment.

FIG. 7 is a flow diagram illustrating a communication pattern of initiating communication, according to an exemplary embodiment. In FIG. 7, communication is established between a plurality of terminals.

Referring to FIG. 7, in operation 710, the host terminal may generate an initiation signaling message including communication initiation tag information and a terminal list of terminals (the host terminal, the first client terminal, and the second client terminal).

In operation 720, the host terminal may transmit the generated initiation signaling message to the first client terminal and the second client terminal.

In operation 730, the first client terminal may transmit a communication acceptance message indicating communication establishment acceptance in response to the initiation signaling message received from the host terminal.

In operation 740, the second client terminal may transmit a communication acceptance message indicating communication establishment acceptance in response to the initiation signaling message received from the host terminal. Herein, the orders of operation 730 and operation 740 may vary according to network states. For example, when a network between the host terminal and the first client terminal is congested, communication between the host terminal and the second client terminal may be established first.

In operation 750, the first client terminal may transmit a trigger signaling message including communication extension tag information to the second client terminal, which is a next-priority terminal following the first client terminal, based on the terminal list of terminals. According to an exemplary embodiment, the communication priority of a plurality of client terminals may be determined according to the order represented in the terminal list of terminals. For example, when the second client terminal is represented before the first client terminal in the terminal list of terminals, the first client terminal may be a next-priority terminal following the second client terminal.

However, a method of determining the communication priority of a plurality of client terminals, according to an exemplary embodiment, is not limited thereto. For example, the communication priority of each client terminal may be separately set in the process of generating the initiation signaling message by the host terminal.

In operation 760, the second client terminal may transmit a communication acceptance message indicating communication establishment acceptance in response to the trigger signaling message received from the first client terminal. Because communication is established between the second client terminal and the first client terminal, full-mesh communication may be established between the first client terminal and the second client terminal.

Figure 8:
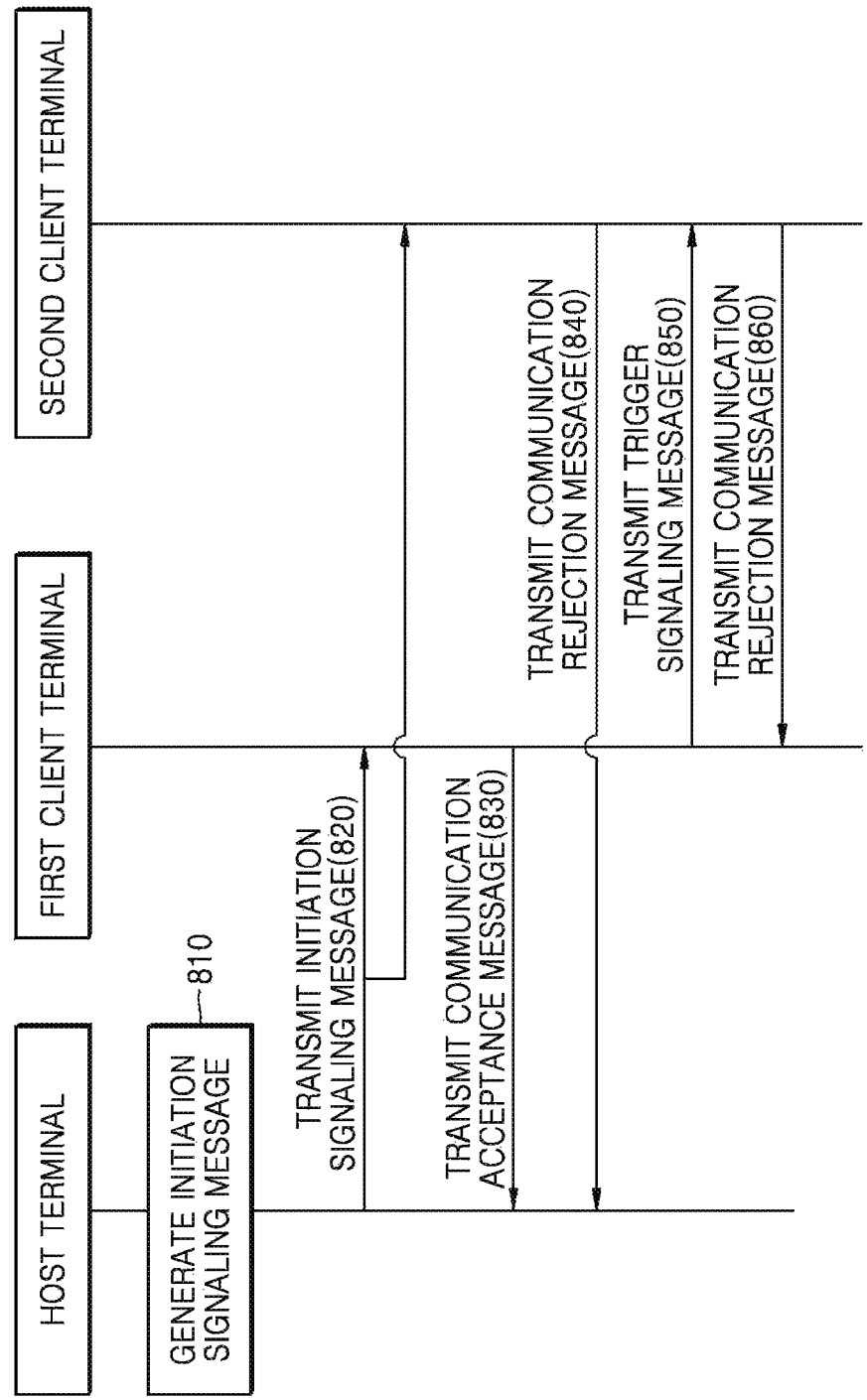
FIG. 8 is a flow diagram illustrating a communication pattern of initiating communication, according to another exemplary embodiment.

FIG. 8 is a flow diagram illustrating a communication pattern of initiating communication, according to another exemplary embodiment. In FIG. 8, communication is established between a portion of a plurality of terminals.

Referring to FIG. 8, in operation 810, the host terminal may generate an initiation signaling message including communication initiation tag information and a terminal list of terminals (the host terminal, the first client terminal, and the second client terminal).

In operation 820, the host terminal may transmit the generated initiation signaling message to the first client terminal and the second client terminal.

In operation 830, the first client terminal may transmit a communication acceptance message indicating communication establishment acceptance in response to the initiation signaling message received from the host terminal.

In operation 840, the second client terminal may transmit a communication rejection message indicating communication establishment rejection in response to the initiation signaling message received from the host terminal.

In operation 850, the first client terminal may transmit a trigger signaling message including communication extension tag information to the second client terminal, which is a next-priority terminal following the first client terminal, based on the terminal list of terminals.

In operation 860, the second client terminal may transmit a communication rejection message indicating communication establishment rejection in response to the trigger signaling message received from the first client terminal. According to an exemplary embodiment, because the host terminal and the second client terminal do not establish communication, the second client terminal may not establish communication with the first client terminal.

In conclusion, the host terminal and the first client terminal establish communication, and the second client terminal does not establish communication with the host terminal and the first client terminal.

Figure 9:
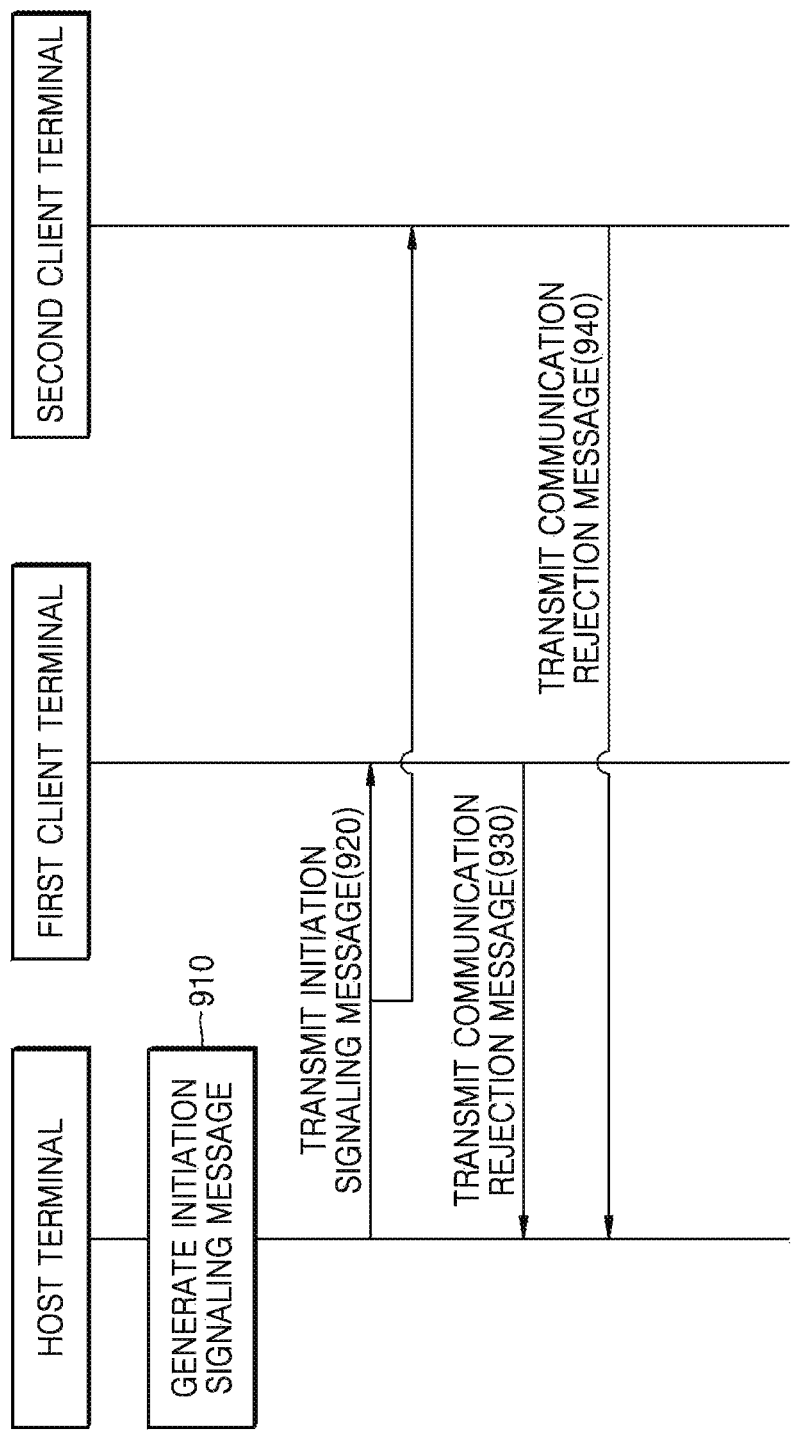
FIG. 9 is a flow diagram illustrating a communication pattern of initiating communication, according to another exemplary embodiment.

FIG. 9 is a flow diagram illustrating a communication pattern of initiating communication, according to another exemplary embodiment.

Referring to FIG. 9, in operation 910, the host terminal may generate an initiation signaling message including communication initiation tag information and a terminal list of terminals (the host terminal, the first client terminal, and the second client terminal).

In operation 920, the host terminal may transmit the generated initiation signaling message to the first client terminal and the second client terminal.

In operation 930, the first client terminal may transmit a communication rejection message indicating communication establishment rejection in response to the initiation signaling message received from the host terminal.

In operation 940, the second client terminal may transmit a communication rejection message indicating communication establishment rejection in response to the initiation signaling message received from the host terminal.

In conclusion, the host terminal, the first client terminal, and the second client terminal do not establish communication therebetween.

Figure 10:
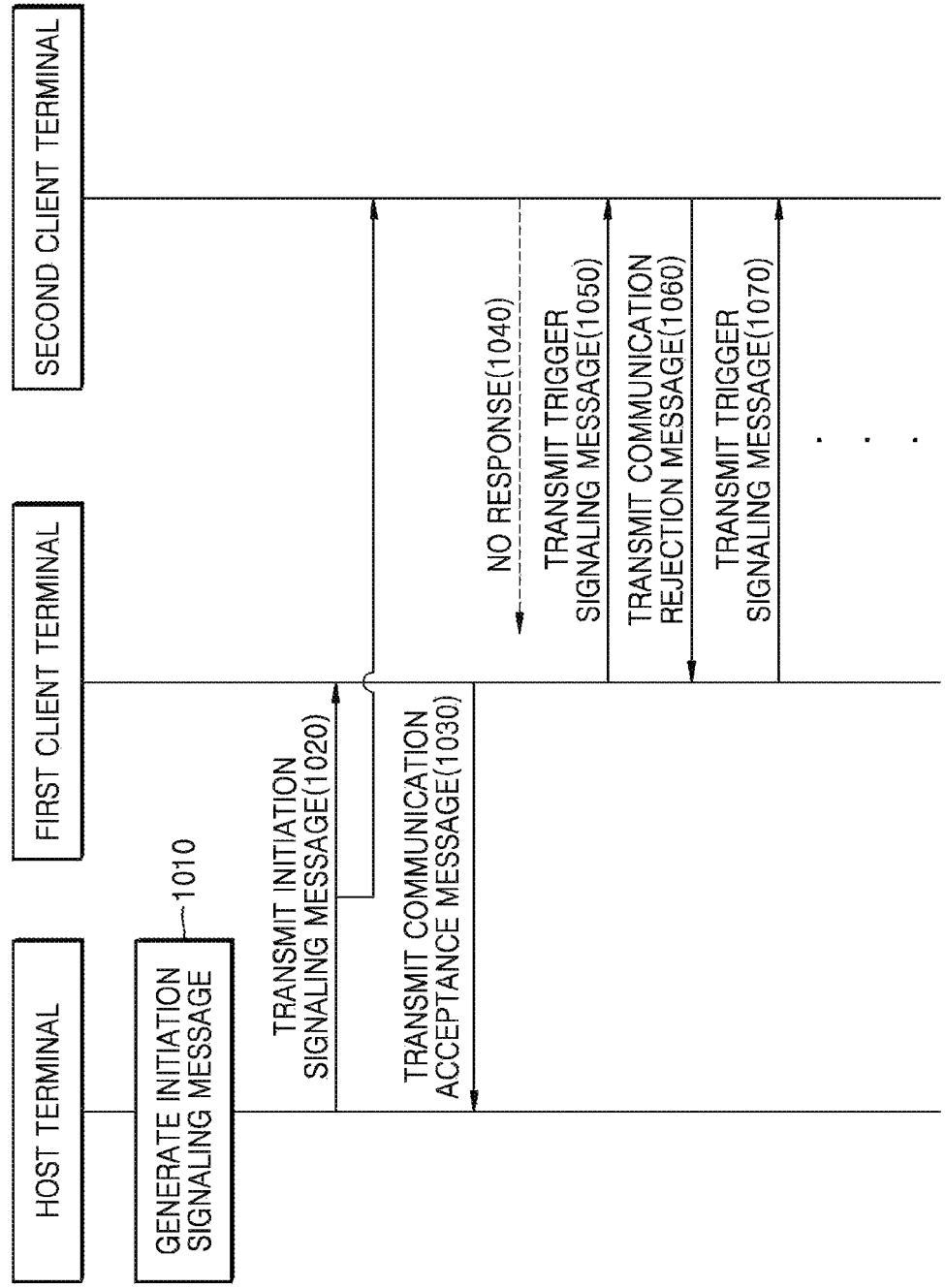
FIG. 10 is a flow diagram illustrating a communication pattern of initiating communication, according to another exemplary embodiment.

FIG. 10 is a flow diagram illustrating a communication pattern of initiating communication, according to another exemplary embodiment. In FIG. 10, communication is not established between some of a plurality of terminals due a connection delay.

Referring to FIG. 10, in operation 1010, the host terminal may generate an initiation signaling message including communication initiation tag information and a terminal list of terminals (the host terminal, the first client terminal, and the second client terminal).

In operation 1020, the host terminal may transmit the generated initiation signaling message to the first client terminal and the second client terminal.

In operation 1030, the first client terminal may transmit a communication acceptance message indicating communication establishment acceptance in response to the initiation signaling message received from the host terminal.

In operation 1040, the second client terminal may not respond to the initiation signaling message received from the host terminal. For example, the second client terminal may fail to respond to the initiation signaling message received from the host terminal, due to a connection delay caused by poor network conditions or the absence of a user.

In operation 1050, the first client terminal may transmit a trigger signaling message including communication extension tag information to the second client terminal, which is a next-priority terminal following the first client terminal, based on the terminal list of terminals.

In operation 1060, the second client terminal may transmit a communication rejection message indicating communication establishment rejection in response to the trigger signaling message received from the first client terminal. According to an exemplary embodiment, because the host terminal and the second client terminal do not establish communication, the second client terminal may not establish communication with the first client terminal.

In operation 1070, the first client terminal may retransmit a trigger signaling message to the second client terminal based on the communication rejection message received from the second client terminal.

According to an exemplary embodiment, when communication is not established due to a connection delay between the host terminal and the second client terminal, the second client terminal may transmit a communication rejection message including communication retrial tag information. According to an exemplary embodiment, when communication establishment is rejected, communication rejection reason tag information may be included in the communication rejection message so that a detailed reason for communication establishment rejection may be identified. Upon receiving the communication rejection message including the communication retrial tag information, the first client terminal may retransmit a trigger signaling message to the host terminal.

According to another exemplary embodiment, when communication is not established between the host terminal and the second client terminal due to a connection delay, the first client terminal may retransmit a trigger signaling message to the second client terminal a predetermined number of times.

In conclusion, the host terminal and the first client terminal establish communication, and the second client terminal may not establish communication with the host terminal and the first client terminal.

Figure 11:
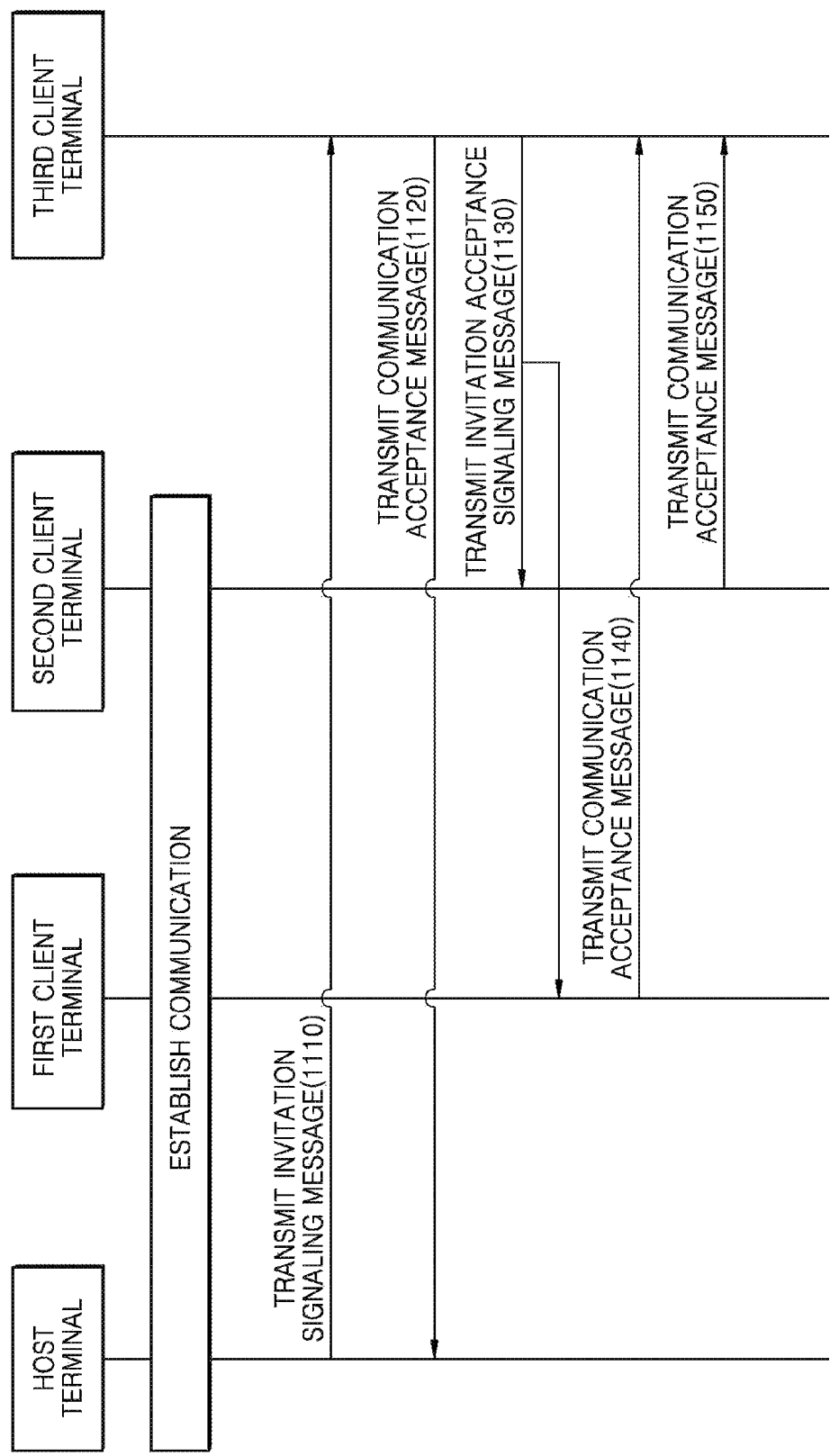
FIG. 11 is a flow diagram illustrating a communication pattern of inviting a third client terminal, according to an exemplary embodiment.

FIG. 11 is a flow diagram illustrating a communication pattern of inviting a third client terminal, according to an exemplary embodiment.

Referring to FIG. 11, in operation 1110, the host terminal may transmit an invitation signaling message, including communication invitation tag information and a terminal list of terminals (for example, the host terminal, the first client terminal, and the second client terminal), to a third client terminal to be invited. Herein, the third client terminal may indicate a terminal that is not represented in the terminal list of terminals.

In operation 1120, the third client terminal may transmit a communication acceptance message indicating communication establishment acceptance in response to the invitation signaling message received from the host terminal.

In operation 1130, the third client terminal may transmit an invitation acceptance signaling message including communication invitation acceptance tag information to at least one client terminal that has established communication with the host terminal. That is, the third client terminal may transmit the invitation acceptance signaling message to the first client terminal and the second client terminal. The invitation acceptance signaling message may be transmitted from the third client terminal to the first client terminal and the second client terminal in response to the third client terminal receiving the invitation signaling message transmitted from the host terminal.

In operation 1140, the first client terminal may transmit a communication acceptance message indicating communication establishment acceptance in response to the invitation acceptance signaling message received from the third client terminal.

In detail, the first client terminal may establish communication with the third client terminal based on information about whether the host terminal and the first client terminal maintain communication establishment at the time when the first client terminal receives the invitation acceptance signaling message from the third client terminal. When the first client terminal maintains communication establishment with the host terminal, the first client terminal may establish communication with the third client terminal.

When the first client terminal receives the invitation acceptance signaling message from the third client terminal, the first client terminal may not maintain communication establishment with the host terminal. For example, after the host terminal invites the third client terminal, the first client terminal may leave current communication.

Because the first client terminal leaves current communication after the host terminal invites the third client terminal, the first client terminal is represented in the terminal list of terminals. Thus, the first client terminal may receive the invitation acceptance signaling message from the third client terminal. The first client terminal may transmit a communication rejection message indicating communication establishment rejection in response to the received invitation acceptance signaling message.

In operation 1150, the second client terminal may transmit a communication acceptance message indicating communication establishment acceptance in response to the invitation acceptance signaling message received from the third client terminal. In detail, because the second client terminal maintains communication establishment with the host terminal, the second client terminal may establish communication with the third client terminal.

In conclusion, full-mesh communication may be established between the host terminal, the first client terminal, the second client terminal, and the third client terminal.

Figure 12:
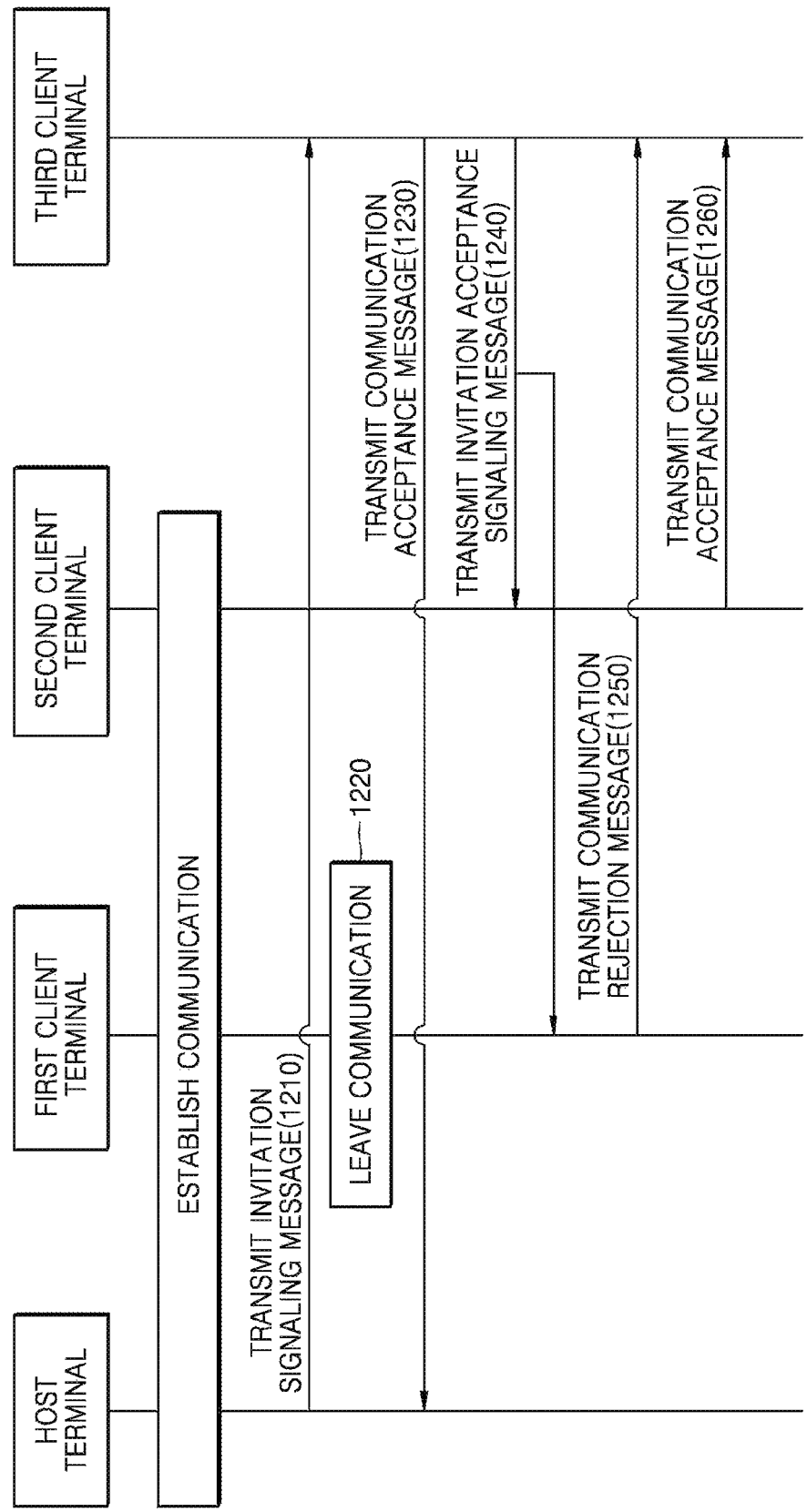
FIG. 12 is a flow diagram illustrating a communication pattern of inviting a third client terminal, according to another exemplary embodiment.

FIG. 12 is a flow diagram illustrating a communication pattern of inviting a third client terminal, according to another exemplary embodiment.

Referring to FIG. 12, in operation 1210, the host terminal may transmit an invitation signaling message, including communication invitation tag information and a terminal list of terminals (the host terminal, the first client terminal, and the second client terminal), to a third client terminal to be invited. Herein, the third client terminal may indicate a terminal that is not represented in the terminal list of terminals.

In operation 1220, the first client terminal may leave communication with the host terminal and the second client terminal.

In operation 1230, the third client terminal may transmit a communication acceptance message indicating communication establishment acceptance to the host terminal in response to the invitation signaling message received from the host terminal.

In operation 1240, the third client terminal may transmit an invitation acceptance signaling message including communication invitation acceptance tag information to at least one client terminal that has established communication with the host terminal. That is, the third client terminal may transmit the invitation acceptance signaling message to the first client terminal and the second client terminal represented in the terminal list of terminals.

In operation 1250, the first client terminal may transmit a communication rejection message indicating communication establishment rejection to the third client terminal in response to the invitation acceptance signaling message received from the third client terminal. In detail, because the first client terminal does not establish communication with the host terminal, the first client terminal may reject communication establishment with the third client terminal.

In operation 1260, the second client terminal may transmit a communication acceptance message indicating communication establishment acceptance to the third client terminal in response to the invitation acceptance signaling message received from the third client terminal. In detail, because the second client terminal maintains communication establishment with the host terminal, the second client terminal may establish communication with the third client terminal.

In conclusion, full-mesh communication may be established between the host terminal, the second client terminal, and the third client terminal.

Figure 13:
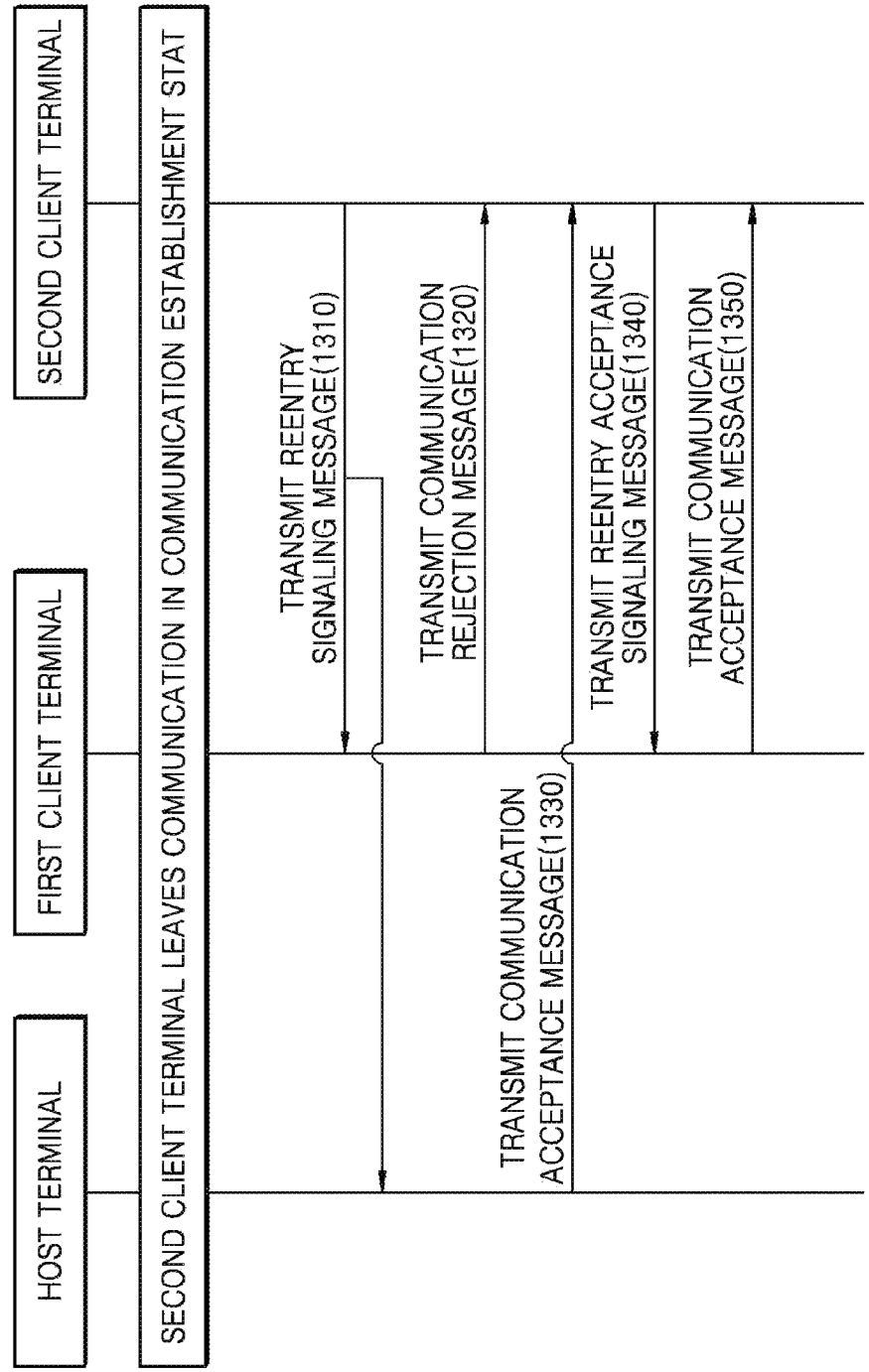
FIG. 13 is a flow diagram illustrating a communication pattern of reentering communication between a plurality of terminals, according to an exemplary embodiment.

FIG. 13 is a flow diagram illustrating a communication pattern of a terminal reentering communication between a plurality of terminals, according to an exemplary embodiment.

In FIG. 13, the second client terminal leaves current communication that is established between the host terminal, the first client terminal, and the second client terminal.

Referring to FIG. 13, in operation 1310, the second client terminal may transmit a reentry signaling message, including communication reentry tag information and a terminal list of terminals, to the host terminal and the first client terminal. Herein, the second client terminal, and the host terminal and the first client terminal, which have established communication with the second client terminal, may be included in the terminal list of terminals.

In operation 1320, the first client terminal may transmit a communication rejection message indicating communication establishment rejection to the second client terminal in response to the reentry signaling message of the second client terminal. According to an exemplary embodiment, the host terminal may determine whether to accept the reentry of a client terminal into current communication.

Therefore, because the first client terminal may not determine whether to accept the reentry of the second client terminal into current communication, the first client terminal may reject communication establishment with the second client terminal. The first client terminal may transmit a communication rejection message indicating communication establishment rejection in response to the reentry signaling message of the second client terminal.

In operation 1330, the host terminal may transmit a communication acceptance message indicating communication establishment acceptance to the second client terminal in response to the reentry signaling message of the second client terminal.

According to an exemplary embodiment, the host terminal may determine whether to accept the reentry of the second client terminal into current communication, based on the terminal list of terminals included in the received reentry signaling message. In detail, the host terminal may compare the terminal list of terminals included in the reentry signaling message with a terminal list of terminals maintaining communication establishment at the time when the host terminal receives the reentry signaling message.

When the terminal list of terminals included in the reentry signaling message is identical to a terminal list of terminals communicating with the host terminal, the host terminal may accept the reentry of the second client terminal into current communication. On the other hand, when the terminal list of terminals is not identical to the terminal list of client terminals, the host terminal may reject the reentry of the second client terminal into current communication.

In operation 1340, the second client terminal may transmit a reentry acceptance signaling message to the first client terminal. According to an exemplary embodiment, the reentry acceptance signaling message may be transmitted to the first client terminal when the second client terminal receives communication reentry acceptance from the host terminal.

In operation 1350, the first client terminal may transmit a communication acceptance message indicating communication establishment acceptance to the second client terminal in response to the reentry acceptance signaling message received from the second client terminal.

Figure 14:
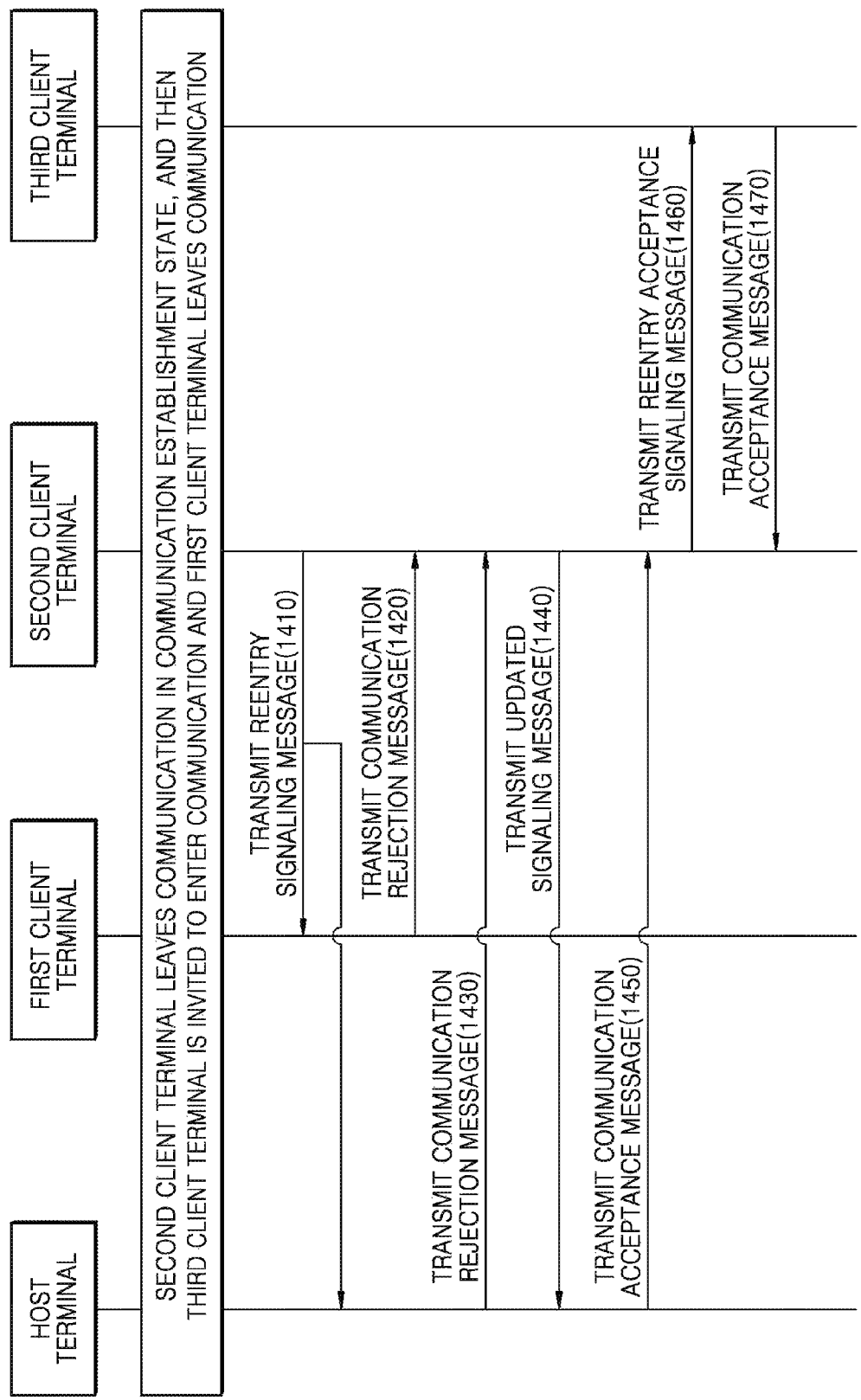
FIG. 14 is a flow diagram illustrating a communication pattern of reentering multipoint communication, according to another exemplary embodiment.

FIG. 14 is a flow diagram illustrating a communication pattern of reentering multipoint communication, according to another exemplary embodiment.

In FIG. 14, the second client terminal leaves current communication that is established between the host terminal, the first client terminal, and the second client terminal. The third client terminal is invited and enters current communication after the second client terminal leaves the current communication, and communication is established between the host terminal and the third client terminal because the first client terminal leaves current communication.

Referring to FIG. 14, in operation 1410, the second client terminal may transmit a reentry signaling message, including communication reentry tag information and a terminal list of terminals, to the host terminal and the first client terminal. Herein, the host terminal, the first client terminal, and the second client terminal are represented in the terminal list of terminals.

In operation 1420, the first client terminal may transmit a communication rejection message indicating communication establishment rejection in response to the reentry signaling message of the second client terminal. The first client terminal may search for the host terminal in the terminal list of terminals included in the received reentry signaling message. According to an exemplary embodiment, the host terminal may be represented as a first-priority terminal in the terminal list of terminals.

Because the first client terminal does not establish communication with the host terminal as a result of searching for the host terminal in the terminal list of terminals, the first client terminal may transmit a communication rejection message indicating communication establishment rejection to the second client terminal.

In operation 1430, the host terminal may transmit a communication rejection message indicating communication establishment rejection to the second client terminal in response to the reentry signaling message of the second client terminal.

According to an exemplary embodiment, the host terminal may determine whether to accept the reentry of the second client terminal into current communication, based on the terminal list of terminals included in the received reentry signaling message. In detail, the host terminal may compare the terminal list of terminals included in the reentry signaling message with a terminal list of terminals maintaining communication establishment at the time when the host terminal receives the reentry signaling message.

The client terminal maintaining communication establishment at the time when the host terminal receives the reentry signaling message is the third client terminal. Therefore, the host terminal and the third client terminal may be represented in the terminal list of the host terminal. On the other hand, the client terminals represented in the terminal list of terminals included in the reentry signaling message received from the second client terminal are the first client terminal and the second client terminal. Thus, the host terminal may reject the reentry of the second client terminal into current communication.

According to an exemplary embodiment, the host terminal may transmit a terminal list of terminals communicating with the host terminal, while rejecting the reentry of the second client terminal into current communication. In detail, the host terminal may insert the terminal list of terminals into a communication rejection message indicating communication establishment rejection and transmit the communication rejection message to the second client terminal.

Herein, when the second client terminal receives the communication rejection message, the second client terminal may read a terminal list of terminals establishing communication with the host terminal and update the terminal list of terminals included in the reentry signaling message. For example, the second client terminal may update the terminal list of terminals such that the second client terminal, the host terminal, and the third client terminal are represented in the terminal list of terminals included in the reentry signaling message.

In operation 1440, the second client terminal may transmit an updated reentry signaling message to the host terminal.

In operation 1450, the host terminal may transmit a communication acceptance message indicating communication establishment acceptance to the second client terminal in response to the updated reentry signaling message received from the second client terminal.

In operation 1460, the second client terminal may transmit a reentry acceptance signaling message to the third client terminal.

In operation 1470, the third client terminal may transmit a communication acceptance message indicating communication establishment acceptance to the second client terminal in response to the reentry acceptance signaling message received from the second client terminal.

In conclusion, communication may be established between the host terminal, the second client terminal, and the third client terminal.

Figure 15:
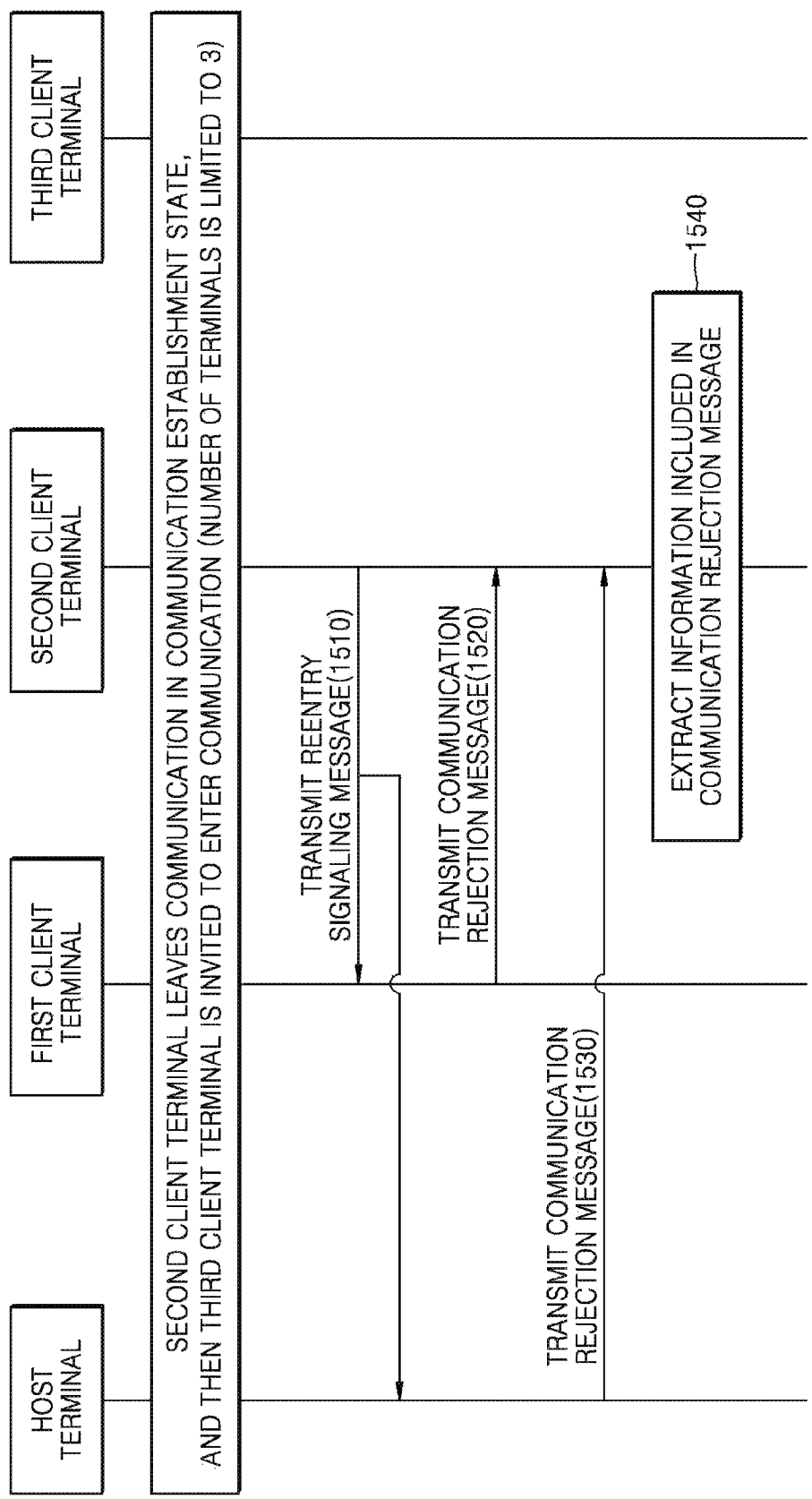
FIG. 15 is a flow diagram illustrating a communication pattern of reentering multipoint communication, according to another exemplary embodiment.

FIG. 15 is a flow diagram illustrating a communication pattern of reentering multipoint communication, according to another exemplary embodiment.

In FIG. 15, communication is established between the host terminal, the first client terminal, and the second client terminal, the second client terminal leaves current communication, and then the third client terminal establishes communication with the host terminal and the first client terminal according to the invitation of the host terminal. Also, according to an exemplary embodiment, the number of terminals that may simultaneously participate in multipoint communication is, for example, 3.

Referring to FIG. 15, in operation 1510, the second client terminal may transmit a reentry acceptance signaling message to the first client terminal.

In operation 1520, the first client terminal may transmit a communication rejection message indicating communication establishment rejection to the second client terminal in response to the reentry signaling message received from the second client terminal.

In operation 1530, the host terminal may transmit a communication rejection message indicating communication establishment rejection to the second client terminal in response to the reentry signaling message received from the second client terminal.

In detail, the host terminal, the first client terminal, and the second client terminal are included in a terminal list of terminals included in the reentry signaling message, while the host terminal, the first client terminal, and the third client terminal are included in a terminal list of the host terminal. Thus, the host terminal may transmit a communication rejection message for rejecting the reentry signaling message of the second client terminal.

Information about a client terminal establishing communication with the host terminal is included in the communication rejection message transmitted from the host terminal to the second client terminal. Also, because the number of terminals that may simultaneously communicate is limited to 3 in FIG. 15, information about the limitation on the number of terminals may be included in the communication rejection message.

In operation 1540, the second client terminal may extract the information about the limitation on the number of terminals included in the communication rejection message, to verify that the communication reentry is rejected due to the limitation on the number of terminals. In detail, because communication is established between the host terminal, the first client terminal, and the third client terminal, the second client terminal may not reenter current communication.

Thus, the second client terminal may determine that the communication establishment is rejected due to the maximum number of terminals, and may determine communication establishment is not possible without updating the terminal list of terminals and transmitting an updated reentry signaling message. In conclusion, communication may be established between the host terminal, the first client terminal, and the third client terminal.

Figure 16:
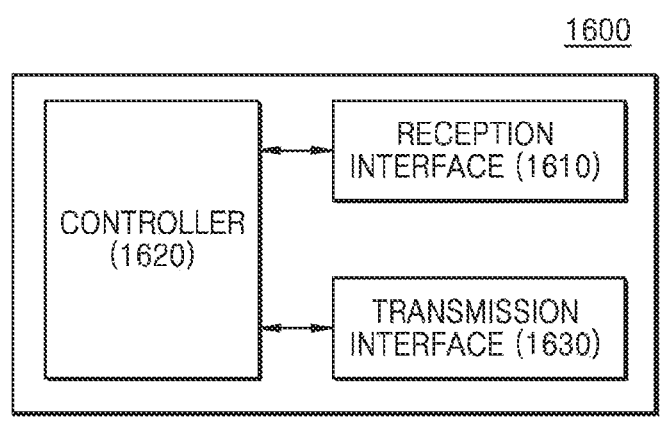
FIG. 16 is a block diagram of a first client terminal configured to establish communication between a plurality of terminals, according to an exemplary embodiment.

FIG. 16 is a block diagram of a first client terminal 1600 configured to establish communication between a plurality of terminals, according to an exemplary embodiment.

Referring to FIG. 16, the first client terminal 1600 may include a reception interface 1610, a controller 1620, and a transmission interface 1630.

In FIG. 16, only components related to the exemplary embodiment are illustrated. Therefore, those of ordinary skill in the art will understand that the first client terminal 1600 may further include other components in addition to the components illustrated in FIG. 16.

The reception interface 1610 may receive an initiation signaling message, including communication initiation tag information and a terminal list of terminals, from the host terminal.

The controller 1620 may determine whether to establish communication with the host terminal, based on a communication state of the first client terminal 1600.

The transmission interface 1630 may transmit a trigger signaling message including communication extension tag information to the second client terminal, which is a next-priority terminal following the first client terminal, based on the terminal list of terminals and information about whether to establish communication with the host terminal, which is determined by the controller 1620. When the first client terminal 1600 establishes communication with the host terminal, the transmission interface 1630 may transmit a trigger signaling message to the second client terminal.

According to an exemplary embodiment, the controller 1620 may establish communication between the first client terminal 1600 and the second client terminal based on the trigger signaling message. Herein, an initiation signaling message may be provided from the host terminal to the second client terminal, and communication may be established between the host terminal and the second client terminal based on a communication state of the second client terminal.

When the host terminal and the second client terminal establish communication, the reception interface 1610 may receive a communication acceptance message indicating communication establishment acceptance from the second client terminal in response to the trigger signaling message. On the other hand, when the host terminal and the second client terminal do not establish communication, the reception interface 1610 may receive a communication rejection message indicating communication establishment rejection from the second client terminal in response to the trigger signaling message.

When communication is not established between the second client terminal and the host terminal due to a connection delay between the second client terminal and the host terminal, the transmission interface 1630 of the first client terminal 1600 may transmit a trigger signaling message a predetermined number of times.

The reception interface 1610 may receive an invitation acceptance signaling message including communication invitation acceptance tag information from the third client terminal that does not exist in the terminal list of terminals.

When an invitation signaling message, including communication invitation tag information and a terminal list of terminals, is transmitted from the host terminal and is received by the third client terminal, the invitation acceptance signaling message may be transmitted from the third client terminal to the first client terminal 1600 in response to the invitation signaling message.

When the first client terminal 1600 and the host terminal maintain communication establishment, the controller 1620 may establish communication with the third client terminal. When the controller 1620 establishes communication with the third client terminal, the transmission interface 1630 may transmit a communication acceptance message indicating communication establishment acceptance to the third client terminal in response to the invitation acceptance signaling message.

The second client terminal leaves and then reenters current communication that is established between the host terminal, the first client terminal 1600, and the second client terminal.

When the second client terminal leaves the current communication, the controller 1620 of the first client terminal 1600 may terminate communication establishment with the second client terminal according to a termination message received from the second client terminal.

Thereafter, when the second client terminal reenters the current communication, the reception interface 1610 of the first client terminal 1600 may receive a reentry signaling message, including communication reentry tag information and a terminal list of terminals, from the second client terminal.

According to an exemplary embodiment, because only the host terminal may determine whether to accept the reentry of a client terminal into current communication, the transmission interface 1630 of the first client terminal 1600 may transmit a communication rejection message indicating communication establishment rejection to the second client terminal.

When the second client terminal receives communication establishment acceptance from the host terminal, the reception interface 1610 of the first client terminal 1600 may receive a reentry acceptance signaling message including communication reentry acceptance tag information from the second client terminal.

According to an exemplary embodiment, the first client terminal 1600 leaves current communication that is established between the host terminal, the first client terminal 1600, and the second client terminal.

The controller 1620 of the first client terminal 1600 may terminate communication establishment with the host terminal and the second client terminal.

When the first client terminal 1600 reenters current communication, the transmission interface 1630 may transmit a reentry signaling message, including communication reentry tag information and a terminal list of terminals, to the host terminal and the second client terminal. Also, the transmission interface 1630 may transmit a reentry acceptance signaling message including communication reentry acceptance tag information to the second client terminal based on a response of the host terminal to the reentry signaling message.

Herein, the reentry acceptance signaling message may be transmitted to the second client terminal when the first client terminal 1600 receives communication reentry acceptance from the host terminal.

In detail, the first client terminal 1600 may receive communication reentry acceptance from the host terminal when the terminal list of terminals included in the reentry signaling message is identical to a terminal list of terminals communicating with the host terminal. When the host terminal accepts the reentry of the first client terminal 1600 into current communication, the reception interface 1610 of the first client terminal 1600 may receive a communication acceptance message indicating communication establishment acceptance from the host terminal.

On the other hand, the first client terminal 1600 may not receive communication reentry acceptance from the host terminal when the terminal list of terminals included in the reentry signaling message is not identical to a terminal list of terminals communicating with the host terminal. When the host terminal rejects the reentry of the first client terminal 1600 into current communication, the reception interface 1610 of the first client terminal 1600 may receive a communication rejection message indicating communication establishment rejection from the host terminal.

When the terminal list of terminals included in the reentry signaling message is not identical to the terminal list of terminals communicating with the host terminal, the controller 1620 may update the terminal list of terminals included in the reentry signaling message into a terminal list of terminals communicating with the host terminal.

The transmission interface 1630 may transmit a reentry signaling message including the updated terminal list of terminals to the host terminal.

Figure 17:
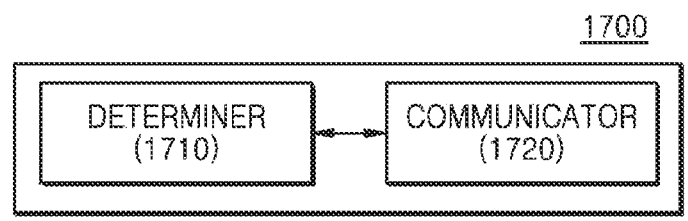
FIG. 17 is a block diagram of a host terminal configured to establish communication between a plurality of terminals, according to an exemplary embodiment.

FIG. 17 is a block diagram of a host terminal 1700 configured to establish communication between a plurality of terminals, according to an exemplary embodiment.

Referring to FIG. 17, the host terminal 1700 may include a determiner 1710 and a communication interface 1720.

In FIG. 17, only components related to exemplary embodiment are illustrated. Therefore, those of ordinary skill in the art will understand that the host terminal 1700 may further include other components in addition to the components illustrated in FIG. 17.

The determiner 1710 may generate an initiation signaling message including communication initiation tag information and a terminal list of terminals. Herein, the terminal list of terminals may include information about communication priority of a plurality of client terminals. According to an exemplary embodiment, a communication establishment trial may be gradually performed between the plurality of client terminals according to the communication priority.

The determiner 1710 may determine whether to establish communication with each client terminal, based on a response of each client terminal to the initiation signaling message.

The communication interface 1720 may transmit the generated initiation signaling message to a plurality of client terminals including the first client terminal 1600 and the second client terminal.

According to an exemplary embodiment, when the host terminal 1700 maintains communication establishment with the first client terminal 1600 and the second client terminal, the host terminal 1700 may invite a third client terminal that does not exist in the terminal list of terminals.

The communication interface 1720 of the host terminal 1700 may transmit an invitation signaling message including communication invitation tag information to the third client terminal.

The determiner 1710 may determine whether to establish communication with the third client terminal, based on a response of the third client terminal to the invitation signaling message.

According to an exemplary embodiment, when the host terminal 1700 maintains communication establishment with the first client terminal 1600 and the second client terminal, the first client terminal 1600 may leave current communication. The determiner 1710 of the host terminal 1700 may terminate communication establishment with the first client terminal 1600 according to a communication termination message received from the first client terminal 1600.

The first client terminal 1600 may leave current communication and then try to reenter the current communication. The communication interface 1720 may receive a reentry signaling message, including communication reentry tag information and a terminal list of terminals, from the first client terminal 1600.

The determiner 1710 may compare the terminal list of terminals included in the reentry signaling message with a terminal list of terminals communicating with the host terminal 1700. When the terminal list of terminals included in the reentry signaling message is identical to the terminal list of terminals communicating with the host terminal 1700 as a determination result, the communication interface 1720 may transmit a communication acceptance message indicating communication establishment acceptance to the first client terminal 1600.

On the other hand, when the terminal list of terminals included in the reentry signaling message is not identical to the terminal list of terminals communicating with the host terminal 1700 as a determination result, the communication interface 1720 may transmit a communication rejection message indicating communication rejection to the first client terminal 1600. When the terminal list of terminals included in the reentry signaling message is not identical to the terminal list of terminals communicating with the host terminal 1700, the determiner 1710 may update the terminal list of terminals into the terminal list of terminals communicating with the host terminal 1700.

Apparatuses consistent with exemplary embodiments may include a processor, a memory for storing and executing program data, a permanent storage such as a disk drive, a communication interface for communicating with an external device, and user interface (UI) devices such as a touch panel, keys, and buttons. Methods implemented by a software module or algorithm may be stored on a computer-readable recording medium as computer-readable codes or program commands that are executable on the processor. Examples of the computer-readable recording medium include magnetic storage media (e.g., read-only memory (ROM), random-access memory (RAM), floppy disks, and hard disks) and optical recording media (e.g., a compact disk-read only memory (CD-ROM) and a digital versatile disc (DVD)). The computer-readable recording medium may also be distributed over network-coupled computer systems so that the computer-readable codes may be stored and executed in a distributed fashion. The computer-readable recording medium is readable by a computer, and may be stored in a memory and executed in a processor.

All references, including publications, patent applications, and patents, cited herein, are hereby incorporated by reference to the same extent as if each reference is individually and specifically indicated to be incorporated by reference and is set forth in its entirety herein.

For the purposes of promoting an understanding of exemplary embodiments, reference has been made to exemplary embodiments illustrated in the drawings, and terms have been used to describe exemplary embodiments. However, the scope of the present invention is not limited by the terms, and the present invention may encompass all elements that may be generally conceived by those of ordinary skill in the art.

Exemplary embodiments may be described in terms of functional block components and various processing operations. Such functional blocks may be implemented by any number of hardware and/or software components that execute functions. For example, exemplary embodiments may employ various integrated circuit (IC) components, such as memory elements, processing elements, logic elements, and lookup tables, which may execute various functions under the control of one or more microprocessors or other control devices. Similarly, where the elements are implemented by software programming or software elements, exemplary embodiments may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, exemplary embodiments may employ components for electronic environment setting, signal processing, and/or data processing. Terms such as "mechanism," "element," "unit," and "configuration" may be used in a broad sense, and are not limited to mechanical and physical configurations. The terms may include the meaning of software routines in conjunction with processors or the like.

Implementations described herein are exemplary, and do not limit the description in any way. For the sake of conciseness, descriptions of related art electronic configurations, control systems, software, and other functional aspects of the systems may be omitted. Also, the connection lines or connection members illustrated in the drawings represent exemplary functional connections and/or physical or logical connections between the various elements, and various alternative or additional functional connections, physical connections, or logical connections may be present in a practical apparatus. Also, no element may be essential to the practice of the embodiments of the present invention unless the element is specifically described as "essential" or "critical".

The use of the terms "a," "an," and "the" and similar referents in the context of the specification (especially in the context of the following claims) may be construed to cover both the singular and the plural. Also, recitation of a range of values herein are intended to serve as a shorthand method of referring individually to each separate value falling within the range, unless otherwise indicated herein, and each separate value is incorporated into the specification as if it were individually recited herein. Also, the operations of the method described herein may be performed in any suitable order unless otherwise indicated herein or otherwise clearly contradicted by the context. The scope of exemplary embodiments is not limited to the above-described operation order. All examples or exemplary terms (e.g., "such as") provided herein are used to describe exemplary embodiments in detail, and the scope is not limited by the examples or exemplary terms unless otherwise claimed. Also, those of ordinary skill in the art will readily understand that various modifications and combinations may be made according to design conditions and factors without departing from the spirit and scope of the present invention as defined by the following claims.

It should be understood that the exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. A method of establishing communication between a plurality of terminals by a first client terminal of the plurality of terminals, the method comprising:
   receiving an initiation signaling message comprising a communication initiation tag and a terminal list of terminals from a host terminal of the plurality of terminals;
   determining whether to establish communication with the host terminal, based on a communication state of the first client terminal;
   determining a second client terminal of the plurality of terminals as a next priority terminal based on the terminal list of terminals;
   transmitting a trigger signaling message comprising a communication extension tag to the second client terminal based on the terminal list of terminals and information about whether to establish communication with the host terminal; and
   receiving an invitation acceptance signaling message comprising a communication invitation acceptance tag from a third client terminal,
   wherein the third client terminal is not indicated in the terminal list of terminals,
   an invitation signaling message comprising a communication invitation tag and the terminal list of terminals is provided from the host terminal to the third client terminal, and
   the invitation acceptance signaling message is provided from the third client terminal to the first client terminal in response to the invitation signaling message.

2. The method of claim 1, further comprising establishing communication between the first client terminal and the second client terminal based on the trigger signaling message,
   wherein the initiation signaling message is provided from the host terminal to the second client terminal and communication between the host terminal and the second client terminal is established based on a communication state of the second client terminal.

3. The method of claim 1, wherein the transmitting is performed in response to the first client terminal establishing communication with the host terminal.

4. The method of claim 1, further comprising:
   receiving a communication acceptance message indicating communication establishment acceptance from the second client terminal in response to the trigger signaling message when the host terminal and the second client terminal establish communication therebetween, and
   receiving a communication rejection message indicating communication establishment rejection from the second client terminal in response to the trigger signaling message when the host terminal and the second client terminal do not establish communication therebetween.

5. The method of claim 1, further comprising simultaneously establishing communication between the first client terminal and the third client terminal, and maintaining communication between the first client terminal and the host terminal.

6. The method of claim 1, further comprising:
terminating communication with the host terminal and the second client terminal;
transmitting a reentry signaling message of the first client terminal comprising a communication reentry tag and the terminal list of terminals to the host terminal and the second client terminal;
receiving a response to the reentry signaling message for the first client terminal from the host terminal; and
transmitting a reentry acceptance signaling message comprising a communication reentry acceptance tag to the second client terminal based on the response,
wherein the reentry acceptance signaling message is transmitted to the second client terminal the response indicating reentry acceptance.

7. A method of establishing communication between a plurality of terminals by a first client terminal of the plurality of terminals, the method comprising:
receiving an initiation signaling message comprising a communication initiation tag and a terminal list of terminals from a host terminal of the plurality of terminals;
determining whether to establish communication with the host terminal, based on a communication state of the first client terminal;
determining a second client terminal of the plurality of terminals as a next priority terminal based on the terminal list of terminals;
transmitting a trigger signaling message comprising a communication extension tag to the second client terminal based on the terminal list of terminals and information about whether to establish communication with the host terminal;
receiving a communication termination message of the second client terminal;
terminating communication with the second client terminal according to the communication termination message received from the second client terminal;
receiving a reentry signaling message of the second client terminal comprising a communication reentry tag and the terminal list of terminals; and
transmitting a communication rejection message indicating communication establishment rejection to the second client terminal in response to the reentry signaling message.

8. A method of establishing communication between a plurality of terminals by a host terminal of the plurality of terminals, the method comprising:
generating an initiation signaling message comprising a communication initiation tag and a terminal list of terminals;
transmitting the generated initiation signaling message to a first client terminal of the plurality of terminals and a second client terminal of the plurality of terminals;
receiving, based on the generated initiation signaling message, a first response from the first client terminal and a second response from the second client terminal; and
determining whether to establish communication with the first client terminal based on the first response and the second client terminal based on the second response;
transmitting an invitation signaling message comprising a communication invitation tag to a third client terminal not indicated in the terminal list of terminals;
receiving a third response from the third client terminal; and
determining whether to establish communication with the third client terminal based on the third response,
wherein, the terminal list of terminals comprises information indicating communication priority of the plurality of client terminals, and
a communication establishment trial is performed between the plurality of client terminals according to the communication priority.

9. A method of establishing communication between a plurality of terminals by a host terminal of the plurality of terminals, the method comprising:
generating an initiation signaling message comprising a communication initiation tag and a terminal list of terminals;
transmitting the generated initiation signaling message to a first client terminal of the plurality of terminals and a second client terminal of the plurality of terminals;
receiving, based on the generated initiation signaling message, a first response from the first client terminal and a second response from the second client terminal; and
determining whether to establish communication with the first client terminal based on the first response and the second client terminal based on the second response;
receiving a communication termination message from the first client terminal;
terminating communication with the first client terminal according to the communication termination message;
receiving a reentry signaling message comprising a communication reentry tag and the terminal list of terminals from the first client terminal; and
comparing the received terminal list of terminals in the reentry signaling message with a stored terminal list of terminals communicating with the host terminal,
wherein, the terminal list of terminals comprises information indicating communication priority of the plurality of client terminals, and
a communication establishment trial is performed between the plurality of client terminals according to the communication priority.

10. The method of claim 9, further comprising:
generating and transmitting a communication acceptance message indicating communication establishment acceptance to the first client terminal when the terminal list of terminals comprised in the reentry signaling message is identical to the terminal list of terminals communicating with the host terminal as a comparison result; and
generating and transmitting a communication rejection message indicating communication establishment rejection to the first client terminal when the terminal list of terminals comprised in the reentry signaling message is not identical to the terminal list of terminals communicating with the host terminal.

11. A first client terminal of a plurality of terminals configured to establish communication between the plurality of terminals, the first client terminal comprising:
a reception interface configured to receive an initiation signaling message comprising a communication initiation tag and a terminal list of terminals from a host terminal of the plurality of terminals;

a controller configured to determine whether to establish communication with the host terminal, based on a communication state of the first client terminal, and determine a second client terminal of the plurality of terminals as a next priority terminal based on the terminal list of terminals; and a transmission interface configured to transmit a trigger signaling message comprising a communication extension tag to the second client terminal based on the terminal list of terminals and information about whether to establish communication with the host terminal, wherein the reception interface further configured to receive an invitation acceptance signaling message comprising a communication invitation acceptance tag from a third client terminal, wherein the third client terminal is not indicated in the terminal list of terminals, an invitation signaling message comprising a communication invitation tag and the terminal list of terminals is provided from the host terminal to the third client terminal, and the invitation acceptance signaling message is provided from the third client terminal to the first client terminal in response to the invitation signaling message.

12. A host terminal of a plurality of terminals configured to establish communication between the plurality of terminals, the host terminal comprising:

a determiner configured to generate an initiation signaling message comprising a communication initiation tag and a terminal list of terminals; and a communicator configured to transmit the generated initiation signaling message to a first client terminal of the plurality of terminals a second client terminal of the plurality of terminals, and to receive a first response from the first client terminal and a second response from the second client terminal, wherein the determiner is further configured to determine whether to establish communication with the first client terminal based on the first response and the second client terminal based on the second response, the communicator is further configured to transmit an invitation signaling message comprising a communication invitation tag to a third client terminal not indicated in the terminal list of terminals and receive a third response from the third client terminal, whether to establish communication with the third client terminal is determined based on the third response, the terminal list of terminals comprises information indicating communication priority of the plurality of client terminals, and a communication establishment trial is performed between the plurality of client terminals according to the communication priority.

13. A non-transitory computer-readable recording medium having embodied thereon a computer program that, when executed by a processor of a first client terminal of a plurality of terminals, causes the first client terminal to execute a method of establishing communication between the plurality of terminals, the method comprising:

receiving an initiation signaling message comprising a communication initiation tag and a terminal list of terminals from a host terminal of the plurality of terminals;

determining whether to establish communication with the host terminal, based on a communication state of the first client terminal;

determining a second client terminal of the plurality of terminals as a next priority terminal based on the terminal list of terminals;

transmitting a trigger signaling message comprising a communication extension tag to the second client terminal based on the terminal list of terminals and information about whether to establish communication with the host terminal; and receiving an invitation acceptance signaling message comprising a communication invitation acceptance tag from a third client terminal, wherein the third client terminal is not indicated in the terminal list of terminals, an invitation signaling message comprising a communication invitation tag and the terminal list of terminals is provided from the host terminal to the third client terminal, and the invitation acceptance signaling message is provided from the third client terminal to the first client terminal in response to the invitation signaling message.

* * * * *